(12) United States Patent
Kodera

(10) Patent No.: US 12,715,507 B2
(45) Date of Patent: Aug. 25, 2026

(54) STEERING CONTROL DEVICE AND STEERING CONTROL METHOD

(71) Applicant: JTEKT CORPORATION, Kariya (JP)

(72) Inventor: Takashi Kodera, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 58 days.

(21) Appl. No.: 18/832,229

(22) PCT Filed: Feb. 3, 2022

(86) PCT No.: PCT/JP2022/004262
§ 371 (c)(1),
(2) Date: Jul. 23, 2024

(87) PCT Pub. No.: WO2023/148886
PCT Pub. Date: Aug. 10, 2023

(65) Prior Publication Data

US 2025/0153768 A1 May 15, 2025

(51) Int. Cl.
*B62D 6/00* (2006.01)

(52) U.S. Cl.
CPC .................................... *B62D 6/008* (2013.01)

(58) Field of Classification Search
CPC .............................. B62D 6/008; B62D 15/025
See application file for complete search history.

(56) References Cited

U.S. PATENT DOCUMENTS 9,227,634 B2 * 1/2016 Oyama ................. B60W 30/12
9,227,663 B2 * 1/2016 Matsuno .............. B62D 15/025
9,663,143 B2 * 5/2017 Tsubaki ............... B62D 5/0463
10,457,322 B2 * 10/2019 Yoshida ............... B62D 5/0463
10,974,761 B2 * 4/2021 Han ..................... B62D 5/0472
11,059,514 B2 7/2021 Kodera
11,097,769 B2 8/2021 Kodera
2005/0103561 A1 5/2005 Endo et al.
2006/0030987 A1 * 2/2006 Akita .................. B62D 15/025
701/41

(Continued)

FOREIGN PATENT DOCUMENTS

JP 2014-223832 A 12/2014
JP 2016-222094 A 12/2016

(Continued)

OTHER PUBLICATIONS

Apr. 22, 2025 extended Search Report issued in European Patent Application No. 22924796.0.

(Continued)

*Primary Examiner* — Joseph J Dallo
(74) *Attorney, Agent, or Firm* — Oliff PLC

(57) ABSTRACT

A steering control device is configured to perform a torque feedback process, an operation process, and a characteristic change process. The torque feedback process includes a process of calculating a manipulated variable for controlling steering torque to target steering torque by feedback control. The steering torque is torque input to an operation member. The operation process is a process of operating a drive circuit for a motor based on the manipulated variable. The characteristic change process is a process of changing a response characteristic of the feedback control according to a magnitude of torque of the motor.

13 Claims, 14 Drawing Sheets

(56) References Cited

U.S. PATENT DOCUMENTS

2006/0085113 A1* 4/2006 Tamaizumi .......... B62D 5/0463 701/41
2008/0047775 A1 2/2008 Yamazaki
2013/0060427 A1 3/2013 Kataoka et al.
2014/0058630 A1* 2/2014 Kezobo ................ B62D 5/0463 701/42
2014/0343794 A1 11/2014 Tamaizumi et al.
2015/0251691 A1* 9/2015 Tamaizumi ........... B62D 6/008 701/41
2016/0251028 A1* 9/2016 Tsubaki ............... B62D 5/0463 701/42
2016/0318548 A1 11/2016 Tsubaki
2016/0347359 A1 12/2016 Ueyama et al.
2017/0183027 A1* 6/2017 Kimura ................ B62D 5/0466
2017/0274928 A1* 9/2017 Minaki .............. B62D 15/0285
2018/0118254 A1* 5/2018 Toko .................... B62D 5/0463
2018/0134309 A1* 5/2018 Moulaire ............. B62D 5/0463
2019/0084611 A1* 3/2019 Klein ................... B62D 5/0442
2019/0308664 A1* 10/2019 Pramod ................ B62D 15/025
2020/0014320 A1* 1/2020 Ito .......................... B60L 50/51
2020/0130737 A1* 4/2020 Kodera .................. B62D 6/008
2020/0156700 A1* 5/2020 Shiraishi .............. B62D 5/0463
2020/0172156 A1* 6/2020 Tamaizumi ............ B62D 6/008
2020/0223475 A1* 7/2020 Tamaizumi .......... B62D 5/0469
2020/0339186 A1* 10/2020 Tamaizumi .......... B62D 5/0469
2020/0339187 A1* 10/2020 Tamaizumi .......... B62D 5/0463
2020/0339188 A1* 10/2020 Tamaizumi .......... B62D 5/0463
2021/0159827 A1* 5/2021 Pramod ............... H02P 21/0003
2021/0188344 A1* 6/2021 Moulaire ............. B62D 5/0463
2021/0229739 A1* 7/2021 Kodera .................. B62D 5/046
2021/0253159 A1* 8/2021 Toyoda ................ B62D 15/021

FOREIGN PATENT DOCUMENTS

JP 2020-069862 A 5/2020
JP 2020-203499 A 12/2020

OTHER PUBLICATIONS

Apr. 19, 2022 International Search Report issued in International Patent Application No. PCT/JP2022/004262.

* cited by examiner

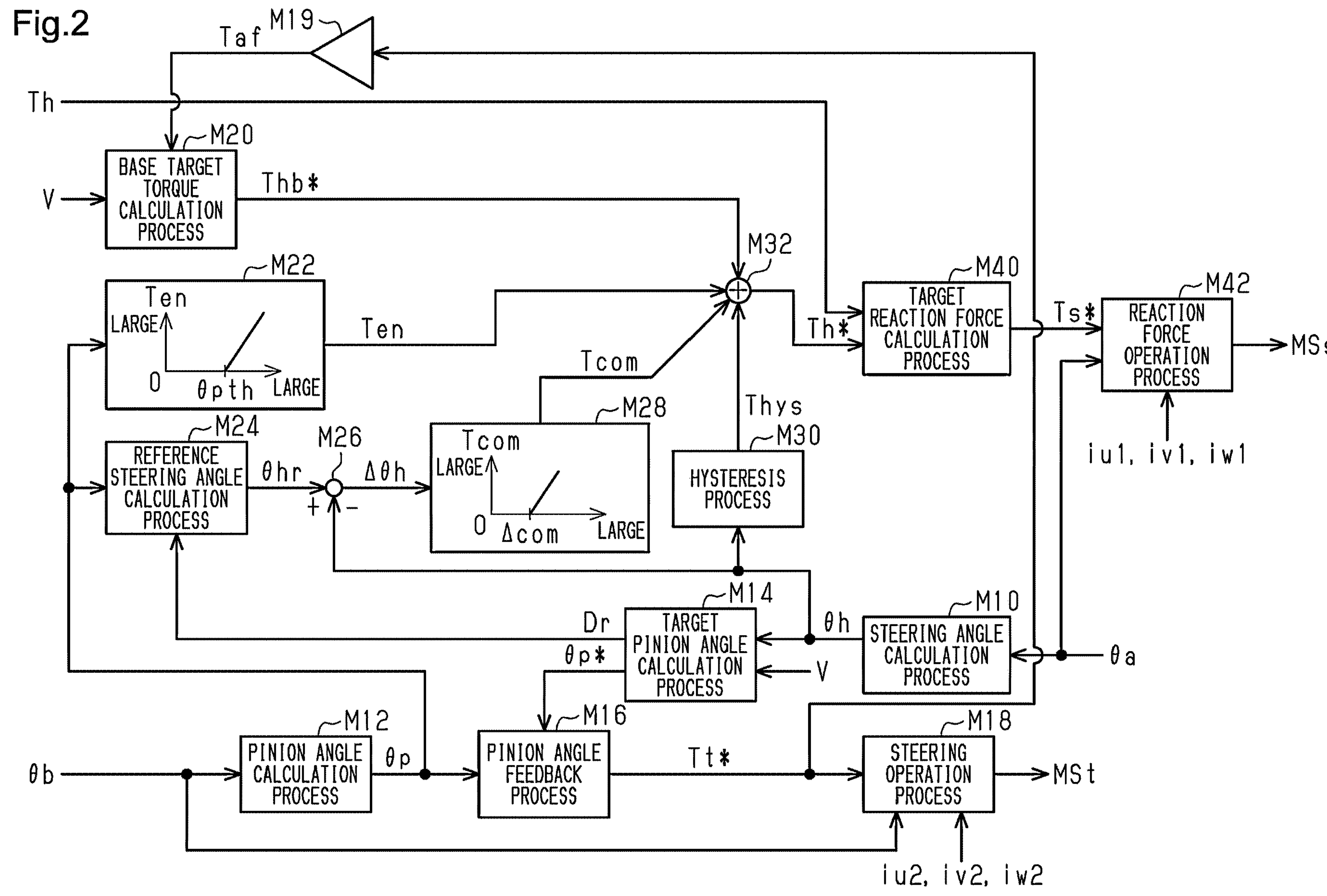
Fig.2
Th
V
θb
M19
Taf
M20
BASE TARGET TORQUE CALCULATION PROCESS
Thb*
M22
Ten
LARGE
0
θpth
LARGE
Ten
M24
REFERENCE STEERING ANGLE CALCULATION PROCESS
θhr
M26
+
-
Δθh
M28
Tcom
LARGE
0
Δcom
LARGE
Tcom
M30
HYSTERESIS PROCESS
Thys
M32
Th*
M40
TARGET REACTION FORCE CALCULATION PROCESS
Ts*
M42
REACTION FORCE OPERATION PROCESS
MSs
iu1, iv1, iw1
θa
M10
STEERING ANGLE CALCULATION PROCESS
θh
V
M14
TARGET PINION ANGLE CALCULATION PROCESS
Dr
θp*
M16
PINION ANGLE FEEDBACK PROCESS
M12
PINION ANGLE CALCULATION PROCESS
θp
Tt*
M18
STEERING OPERATION PROCESS
MSt
iu2, iv2, iw2

M50
M70
Th
+
Th*
−
ΔTh
M60
ABS
Kp
M72
M76
M74
LARGE
Gp
SMALL
SMALL
T1
T2
LARGE
Gp
M82
s
M84
Kd
M88
M86
LARGE
Gd
SMALL
SMALL
T3
T4
LARGE
Gd
M80
M90
+
+
Tpd
M92
Ts2
M94
+
+
Ts*

Th
Th*
M50
+
−
ΔTh
Ten
M60
ABS
M70
M72
Kp
M76
M74
LARGE
Gp
SMALL
SMALL T1 T2 LARGE
Gp
M82
s
M84
Kd
M88
M86
LARGE
Gd
SMALL
SMALL T3 T4 LARGE
Gd
M80
M90
+
+
Tpd
M92
Ts2
M94
+ +
Ts*

Fig.5

M50
Th
Th*
+
−
ΔTh
M70
M72
Kp
M76
M74
LARGE
Gp
SMALL
SMALL
T1
T2
LARGE
Gp
M64
GRADUAL CHANGE PROCESS
M62
VARIABLE CONVERSION PROCESS
F
M82
s
M84
Kd
M88
M86
LARGE
Gd
SMALL
SMALL
T3
T4
LARGE
Gd
M80
M90
+
+
Tpd
M92
Ts2
M94
+
+
Ts*

M50
M70
Th
Th*
ΔTh
M72
Kp
M76
M74
LARGE
Gp
SMALL
SMALL
T1
T2
LARGE
Gp
M60
θh
ABS
M82
s
M84
Kd
M88
M86
LARGE
Gd
SMALL
SMALL
T3
T4
LARGE
Gd
M80
M90
Tpd
M94
M92
Ts2
Ts*

Th
Th*
M50
M70
ΔTh
Kp
M72
M76
M74
LARGE
Gp
SMALL
SMALL T1 T2 LARGE
Tcom
ABS
M60
s
M82
Kd
M84
M88
M86
Gd
T3 T4
M80
M90
Tpd
M92
Ts2
M94
Ts*

Th
Th*
M50
+
−
ΔTh
M60
ABS
M70
M72
Kp
M102
fc
LARGE
SMALL
T1 T2
M100
1
(Tp·s+1)
M80
M82
s
M84
Kd
M112
M110
ad·Td·s+1
(Td·s+1)
M90
Tpd
M92
Ts2
M94
Ts*

M50
Th
Th*
+
−
ΔTh
M60
Ten
ABS
M70
M72
Kp
M100
1
(Tp·s+1)
M102
LARGE
fc
SMALL
SMALL T1 T2 LARGE
fc
M80
M82
s
M84
Kd
M110
ad·Td·s+1
(Td·s+1)
M112
M90
Tpd
M92
Ts2
M94
Ts*

Th
Th*
M50
+
−
ΔTh
M70
M72
Kp
M102
fc
LARGE
fc
SMALL
SMALL
T1 T2
LARGE
M100
1
(Tp・s+1)
M90
+
+
Tpd
M64
GRADUAL CHANGE PROCESS
M62
VARIABLE CONVERSION PROCESS
F
M80
M82
s
M84
Kd
M112
M110
ad・Td・s+1
(Td・s+1)
M92
Ts2
M94
+
+
Ts*

Th
Th*
θh
M50
+
−
ΔTh
M60
ABS
M70
M72
Kp
M102
fc
LARGE
SMALL
T1 T2
M100
1
(Tp•s+1)
M80
M82
s
M84
Kd
M112
M110
ad•Td•s+1
(Td•s+1)
M90
Tpd
M92
Ts2
M94
Ts*

Th
Th*
Tcom
M50
+
−
ΔTh
M60
ABS
M70
M72
Kp
M102
LARGE
fc
SMALL
SMALL
T1 T2
LARGE
fc
M100
1
(Tp•s+1)
M80
M82
s
M84
Kd
M112
M110
ad•Td•s+1
(Td•s+1)
M90
Tpd
M92
Ts2
M94
Ts*

Th
Th*
M50
+
-
ΔTh
M60
ABS
M70
M72
Kp
M74
Gp
LARGE
SMALL
T1
T2
M76
M80
M82
s
M84
Kd
M86
Gd
T3
T4
M88
M90a
Tpd
M92
Ts2
M94
Ts*

STEERING CONTROL DEVICE AND STEERING CONTROL METHOD

CROSS-REFERENCE TO RELATED APPLICATIONS

This application is national stage application of International Application No. PCT/JP2022/004262, filed on Feb. 3, 2022, which designates the United States, the entire contents of which are incorporated herein by reference.

TECHNICAL FIELD

The present disclosure relates to steering control devices and steering control methods.

BACKGROUND ART

For example, Patent Document 1 below describes a control device that performs feedback control to control, to a target value, steering torque that is torque to be applied to a steering wheel.

RELATED ART DOCUMENTS

Patent Documents

Patent Document 1: Japanese Unexamined Patent Application Publication No. 2014-223832 (JP 2014-223832 A)

SUMMARY OF THE INVENTION

Problem to be Solved by the Invention

In a case of performing the above feedback control for torque, an issue is to achieve both stability and responsivity.

Means for Solving the Problem

An aspect of the present disclosure provides a steering control device configured to operate a motor mechanically connected to an operation member to be operated by a driver to steer a vehicle. The steering control device is configured to perform a torque feedback process, an operation process, and a characteristic change process. The torque feedback process includes a process of calculating a manipulated variable for controlling steering torque to target steering torque by feedback control. The steering torque is torque input to the operation member. The operation process includes a process of operating a drive circuit for the motor based on the manipulated variable. The characteristic change process includes a process of changing a response characteristic of the feedback control according to a magnitude of torque of the motor.

Another aspect of the present disclosure provides a steering control method for operating a motor mechanically connected to an operation member to be operated by a driver to steer a vehicle. The steering control method includes performing a torque feedback process, performing an operation process, and performing a characteristic change process. The torque feedback process includes a process of calculating a manipulated variable for controlling steering torque to target steering torque by feedback control. The steering torque is torque input to the operation member. The operation process includes a process of operating a drive circuit for the motor based on the manipulated variable. The characteristic change process includes a process of changing a response characteristic of the feedback control according to a magnitude of torque of the motor.

BRIEF DESCRIPTION OF THE DRAWINGS

FIG. 2 is a block diagram showing part of processes that are performed by a steering control device according to the first embodiment.

FIG. 5 is a flowchart showing the procedure of processes that are performed by a steering control device according to a third embodiment.

MODES FOR CARRYING OUT THE INVENTION

First Embodiment

A first embodiment of a steering control device will be described below with reference to the drawings.

"Prerequisite Configuration"

Figure 1:
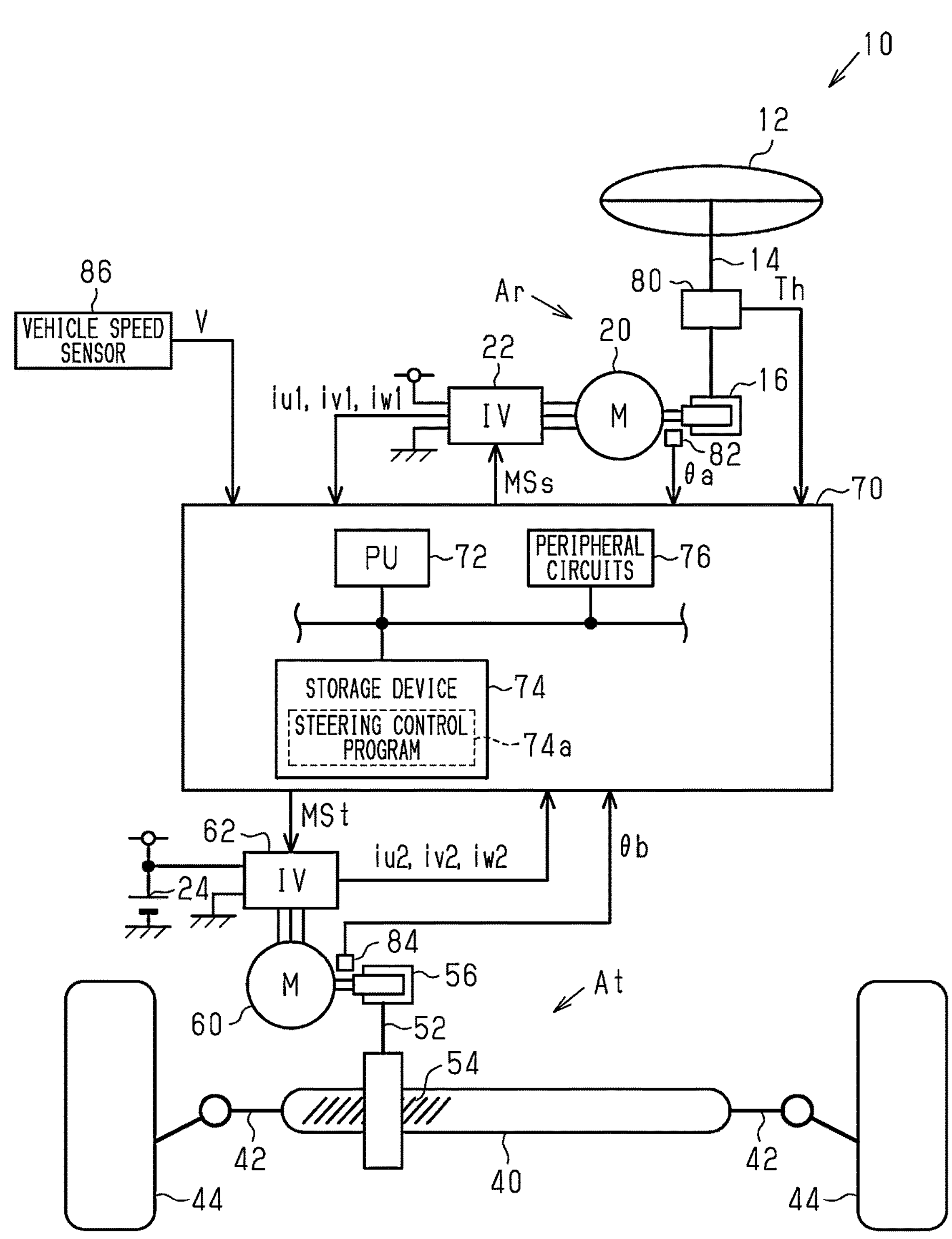
FIG. 1 is a diagram showing the configuration of a vehicle according to a first embodiment.

As shown in FIG. 1, a steering system 10 of a vehicle includes a reaction force actuator Ar and a steering actuator At. The steering system 10 of the present embodiment has a structure in which a power transmission path between a steering wheel 12 and steered wheels 44 is mechanically disconnected. That is, the steering system 10 includes a steer-by-wire steering device.

A steering shaft 14 is connected to the steering wheel 12. The reaction force actuator Ar is an actuator that applies a steering reaction force to the steering wheel 12. The steering reaction force refers to a force that acts in an opposite direction to a direction in which the steering wheel 12 is operated by a driver. Applying the steering reaction force to the steering wheel 12 can provide suitable tactile feedback to the driver. The reaction force actuator Ar includes a speed reduction mechanism 16, a reaction force motor 20, and a reaction force inverter 22.

The reaction force motor 20 is a three-phase brushless motor. A rotating shaft of the reaction force motor 20 is connected to the steering shaft 14 via the speed reduction mechanism 16. The reaction force inverter 22 is a power conversion circuit that converts the voltage of a battery 24 that is a direct current voltage source to an alternating current voltage and applies the alternating current voltage to the reaction force motor 20.

A steered shaft 40 extends in a vehicle width direction that is a left-right direction in FIG. 1. The right and left steered wheels 44 are connected to both ends of the steered shaft 40 via tie rods 42. The steered angle of the steered wheels 44 is changed as the steered shaft 40 makes a linear motion.

The steering actuator At includes a speed reduction mechanism 56, a steering motor 60, and a steering inverter 62. The steering motor 60 is a three-phase brushless motor. A rotating shaft of the steering motor 60 is connected to a pinion shaft 52 via the speed reduction mechanism 56. Pinion teeth of the pinion shaft 52 mesh with rack teeth 54 of the steered shaft 40. The pinion shaft 52 and the steered shaft 40 with the rack teeth 54 form a rack and pinion mechanism. Torque of the steering motor 60 is applied as a steering force to the steered shaft 40 via the pinion shaft 52. The steered shaft 40 moves in the vehicle width direction that is the left-right direction in FIG. 1 in response to rotation of the steering motor 60.

The steering system 10 includes a control device 70. The steering device is a controlled object of the control device 70. More specifically, the steering wheel 12 of the steering device is a controlled object of the control device 70. The control device 70 operates the reaction force actuator Ar in order to control the steering reaction force that is a controlled variable for the controlled object. An operation signal MSs for the reaction force inverter 22 is shown in FIG. 1. The steered wheels 44 of the steering device are also controlled objects of the control device 70. The control device 70 operates the steering actuator At in order to control the steered angle of the steered wheels 44 that is a controlled variable for the controlled objects. The steered angle is a turning angle of tires. An operation signal MSt for the steering inverter 62 is shown in FIG. 1.

The control device 70 refers to steering torque Th detected by a torque sensor 80, namely input torque to the steering shaft 14, in order to control the controlled variable. The torque sensor 80 includes a torsion bar connected to the steering shaft 14, and a sensing element that detects a torsion angle of the torsion bar. The control device 70 also refers to a rotation angle θa of the rotating shaft of the reaction force motor 20 detected by a rotation angle sensor 82. The control device 70 also refers to currents iu1, iv1, and iw1 flowing through the reaction force motor 20. The currents iu1, iv1, and iw1 are quantified as voltage drops across shunt resistors provided in legs of the reaction force inverter 22. The control device 70 refers to a rotation angle θb of the rotating shaft of the steering motor 60 detected by a rotation angle sensor 84 in order to control the controlled variable. The control device 70 also refers to currents iu2, iv2, and iw2 flowing through the steering motor 60. The currents iu2, iv2, and iw2 are quantified as voltage drops across shunt resistors provided in legs of the steering inverter 62. The control device 70 also refers to a vehicle speed V detected by a vehicle speed sensor 86.

The control device 70 includes a PU 72, a storage device 74, and peripheral circuits 76. The PU 72 is a software processing device such as a CPU, a GPU, and a TPU. The storage device 74 includes a storage medium such an electrically rewritable nonvolatile memory and a disk medium. The storage device 74 stores a steering control program 74*a*. The peripheral circuits 76 include a circuit for generating a clock signal that regulates internal operations, a power supply circuit, and a reset circuit. The control device 70 controls the controlled variables by the PU 72 executing the steering control program 74*a* stored in the storage device 74.

"Control"

FIG. 2 shows part of processes that are performed by the control device 70. A steering angle calculation process M10 is a process of calculating a steering angle θh that is a rotation angle of the steering wheel 12 by using the rotation angle θa as an input. The steering angle calculation process M10 includes a process of converting the rotation angle θa to, for example, a cumulative angle including a range exceeding 360° by counting the number of revolutions of the reaction force motor 20 from a neutral steering position that is the position of the steering wheel 12 when the vehicle is traveling straight. The steering angle calculation process M10 includes a process of calculating the steering angle θh by multiplying the cumulative angle obtained by the conversion by a conversion factor that is based on a rotational speed ratio of the speed reduction mechanism 16. For example, the steering angle θh is positive when it is an angle to the right of the neutral steering position, and is negative when it is an angle to the left of the neutral steering position.

A pinion angle calculation process M12 is a process of calculating a pinion angle θp that is a rotation angle of the pinion shaft 52 by using the rotation angle θb as an input. The pinion angle calculation process M12 includes a process of converting to, for example, a cumulative angle including a range exceeding 360° by counting the number of revolutions of the steering motor 60 from a neutral rack position that is the position of the steered shaft 40 when the vehicle is traveling straight. The pinion angle calculation process M12 includes a process of calculating the pinion angle θp that is an actual rotation angle of the pinion shaft 52 by multiplying the cumulative angle obtained by the conversion by a conversion factor that is based on a rotational speed ratio of the speed reduction mechanism 56. For example, the pinion angle θp is positive when it is an angle to the right of the neutral rack position, and is negative when it is an angle to the left of the neutral rack position. The steering motor 60 and the pinion shaft 52 operate in conjunction with each other via the speed reduction mechanism 56. Therefore, there is a one-to-one correspondence between a cumulative value of the rotation angle θb of the steering motor 60 and the pinion angle θp. The pinion angle θp can be obtained from the rotation angle θb of the steering motor 60 using this correspondence. The pinion shaft 52 meshes with the steered shaft 40. Therefore, there is also a one-to-one correspondence between the pinion angle θp and the amount of movement of the steered shaft 40. Thus, there is also a one-to-one correspondence between the pinion angle θp and the steered angle of the steered wheels 44.

A target pinion angle calculation process M14 is a process of calculating a target pinion angle θp* by using the steering angle θh and the vehicle speed V as inputs. The target pinion angle θp* is a target value of the pinion angle θp according to the operation of the steering wheel 12 by the driver. The target pinion angle calculation process M14 includes a process of variably setting a steering angle ratio Dr according to the vehicle speed V. Accordingly, the value of the target pinion angle θp* output through the target pinion angle calculation process M14 varies according to the vehicle speed V even when the input steering angle θh is the same.

A pinion angle feedback process M16 is a process of calculating a steering torque command value Tt* that is a command value for the torque of the steering motor 60 in order to control the pinion angle θp to the target pinion angle θp* by feedback control.

A steering operation process M18 is a process of outputting the operation signal MSt for the steering inverter 62 by using the steering torque command value Tt*, the currents iu2, iv2, and iw2, and the rotation angle θb as inputs. The steering operation process M18 includes a process of calculating dq-axis current command values based on the steering torque command value Tt*. The steering operation process M18 includes a process of calculating dq-axis currents based on the currents iu2, iv2, and iw2 and the rotation angle θb. The steering operation process M18 includes a process of calculating the operation signal MSt in order to operate the steering inverter 62 so that the dq-axis currents are brought to the command values.

An axial force calculation process M19 includes a process of calculating an axial force Taf by using the steering torque command value Tt* as an input. The axial force Taf is a force in the axial direction that is applied to the steered shaft 40. A base target torque calculation process M20 is a process of calculating, based on the axial force Taf, base target torque Thb* that is a base value of target steering torque Th* to be input to the steering shaft 14 by the driver via the steering wheel 12. Since the axial force Taf is a quantity according to a lateral force acting on the steered wheels 44, the lateral force can be known from the axial force Taf. It is desirable that torque to be input to the steering shaft 14 by the driver via the steering wheel 12 be determined according to the lateral force. Therefore, the base target torque calculation process M20 is a process of calculating the base target torque Thb* according to the lateral force known from the axial force Taf.

Specifically, the base target torque calculation process M20 includes a process of variably setting the base target torque Thb* according to the vehicle speed V even when an absolute value of the axial force Taf is the same. This process may be, for example, a process of performing a calculation so that the base target torque Thb* when the vehicle speed V is small is equal to or less than the base target torque Thb* when the vehicle speed V is large. For example, this can be implemented by the PU 72 performing a map calculation of the base target torque Thb* with map data stored in advance in the storage device 74. The map data is data whose input variables are the axial force Taf or a lateral acceleration known from the axial force Taf and the vehicle speed V and whose output variable is the base target torque Thb*.

The map data is a data set of discrete values of the input variables and values of the output variable corresponding to the values of the input variables. The map calculation may be a process in which, when the values of the input variables match any of the values of the input variables in the map data, a corresponding value of the output variable in the map data is output as a calculation result. The map calculation may be a process in which, when the values of the input variables do not match any of the values of the input variables in the map data, a value obtained by interpolating a plurality of values of the output variable included in the map data is output as a calculation result. Alternatively, the map computation may be a process in which, when the values of the input variables do not match any of the values of the input variables in the map data, the value of the output variable in the map data that corresponds to the values of the input variables in the map data closest to the values of the input variables, out of the plurality of values of the output variables included in the map data, is output as a calculation result.

The end reaction force calculation process M22 is a process of calculating an end reaction force Ten. The end reaction force Ten is an amount of torque requested of the reaction force motor 20 to prevent the steering angle θh from changing in a direction in which the magnitude of the pinion angle θp further increases when the magnitude of the pinion angle θp is equal to or greater than an end threshold value θpth. The end reaction force calculation process M22 includes a process of setting the end reaction force Ten to zero when the magnitude of the pinion angle θp is less than the end threshold value θpth. The end reaction force calculation process M22 includes a process in which, when the magnitude of the pinion angle θp is equal to or greater than the end threshold value θpth, the end reaction force Ten when the magnitude of the pinion angle θp is large is equal to or greater than the end reaction force Ten when the magnitude of the pinion angle θp is small. This process can be implemented by the PU 72 performing a map calculation of the end reaction force Ten with map data stored in advance in the storage device 74. The map data is data whose input variable is the pinion angle θp and whose output variable is the end reaction force Ten.

A reference steering angle calculation process M24 is a process of calculating a reference steering angle θhr by using the pinion angle θp and the steering angle ratio Dr as inputs. The reference steering angle θhr is an angle at which the ratio of the pinion angle θp to the steering angle θh is the steering angle ratio Dr when the steering angle θh is the reference steering angle θhr. In other words, the reference steering angle θhr is a value obtained by converting the value of the pinion angle θp to the value of the corresponding steering angle θh. The value of the steering angle θh corresponds to an amount of displacement of an operation member when the operation member is the steering wheel 12. When the reference steering angle θhr deviates significantly from the steering angle θh, it indicates that the pinion angle θp does not follow the target pinion angle θp*.

A deviation calculation process M26 is a process of outputting a steering angle deviation Δθh that is a value obtained by subtracting the steering angle θh from the reference steering angle θhr. A deviation compensation reaction force calculation process M28 is a process of calculating a deviation compensation reaction force Tcom. The deviation compensation reaction force Tcom is an amount of torque requested of the reaction force motor 20 to suppress the deviation between the reference steering angle θhr and the steering angle θh. The deviation compensation reaction force calculation process M28 includes a process of setting the deviation compensation reaction force Tcom to zero when the magnitude of the steering angle deviation Δθh is less than a compensation threshold value Δcom. The deviation compensation reaction force calculation process M28 includes a process in which, when the magnitude of the steering angle deviation Δθh is equal to or greater than the compensation threshold value Δcom, the magnitude of the deviation compensation reaction force Tcom when the magnitude of the steering angle deviation Δθh is large is equal to or greater than the magnitude of the deviation compensation reaction force Tcom when the magnitude of the steering angle deviation Δθh is small. This process can be implemented by the PU 72 performing a map calculation of the deviation compensation reaction force Tcom with map data stored in advance in the storage device 74. The map data is data whose input variable is the steering angle deviation Δθh and whose output variable is the deviation compensation reaction force Tcom.

A hysteresis process M30 is a process of calculating and outputting a hysteresis correction amount Thys for correcting the base target torque Thb*, based on the steering angle θh. More specifically, the hysteresis process M30 includes a process of calculating the hysteresis correction amount Thys by identifying turning and returning of the steering wheel 12 based on changes in steering angle θh, etc. More specifically, the hysteresis process M30 includes a process of calculating the hysteresis correction amount Thys so that the absolute value of the target steering torque Th* becomes greater when returning than when returning. The hysteresis process M30 includes a process of variably setting the hysteresis correction amount Thys according to the vehicle speed V.

An addition process M32 is a process of calculating the target steering torque Th* by adding the end reaction force Ten, the deviation compensation reaction force Tcom, and the hysteresis correction amount Thys to the base target torque Thb*.

A target reaction force calculation process M40 is a process of calculating a target reaction force Ts* according to the steering reaction force to be applied to the steering wheel 12, by using the steering torque Th and the target steering torque Th* as inputs. The target reaction force Ts* is actually a command value for the reaction force motor 20. The steering reaction force is a value obtained by multiplying the target reaction force Ts* by a coefficient according to the reduction ratio of the speed reduction mechanism 16.

A reaction force operation process M42 is a process of outputting the operation signal MSs for the reaction force inverter 22 by using the target reaction force Ts*, the currents iu1, iv1, and iw1, and the rotation angle θa as inputs. The reaction force operation process M42 includes a process of calculating dq-axis current command values based on the target reaction force Ts*. The reaction force operation process M42 includes a process of calculating dq-axis currents based on the currents iu1, iv1, and iw1 and the rotation angle θa. The reaction force operation process M42 includes a process of calculating the operation signal MSs in order to operate the reaction force inverter 22 so that the dq-axis currents are brought to the command values.

Figure 3:
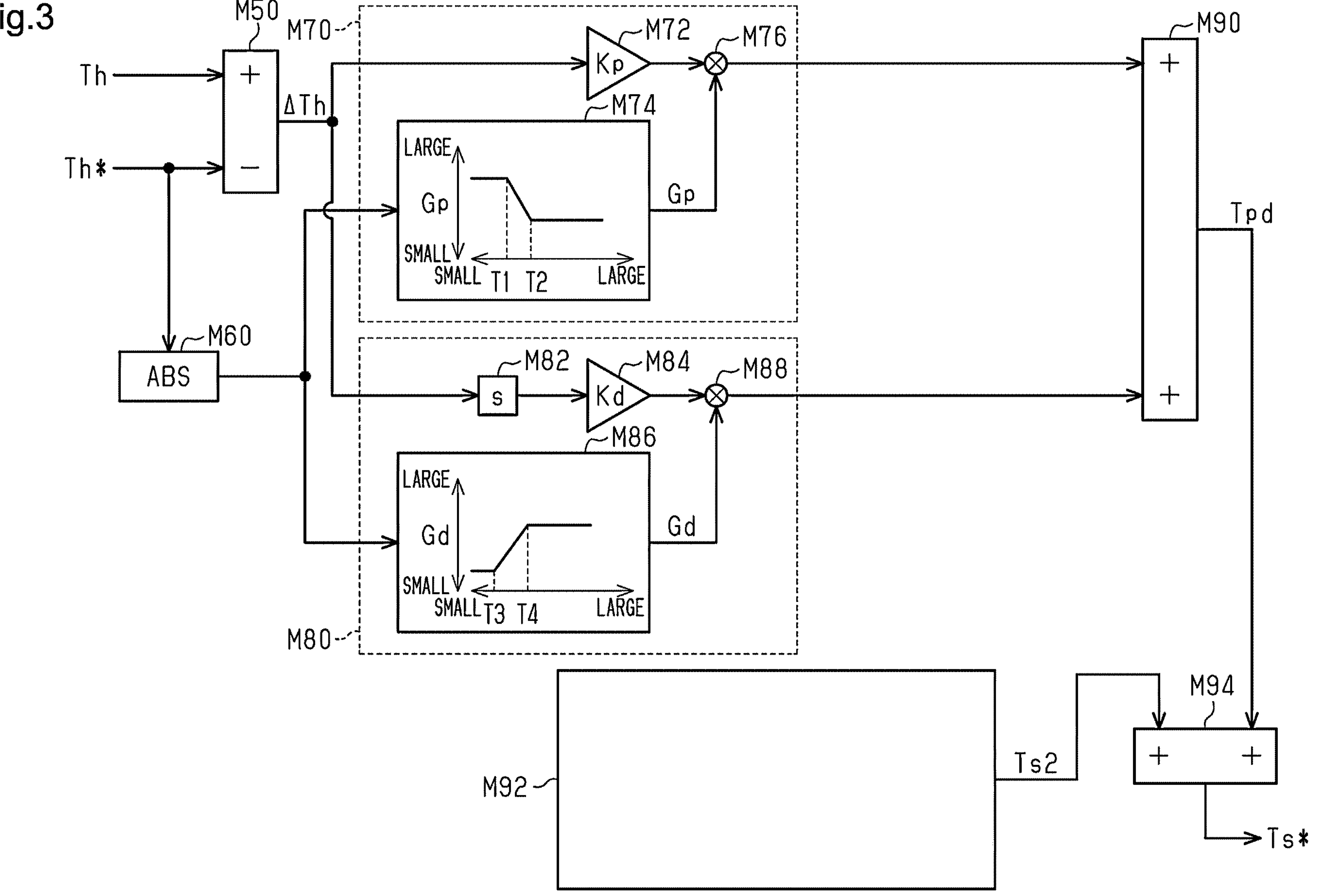
FIG. 3 is a block diagram showing part of the processes that are performed by the steering control device according to the first embodiment.

FIG. 3 shows details of the target reaction force calculation process M40. A deviation calculation process M50 is a process of calculating a torque deviation ΔTh that is a value obtained by subtracting the target steering torque Th* from the steering torque Th.

An absolute value calculation process M60 is a process of calculating the absolute value of the target steering torque Th*.

A proportional element M70 is a process that takes the torque deviation ΔTh as an input and outputs a value proportional to the torque deviation ΔTh. More specifically, a proportional gain multiplication process M72 is a process of multiplying the torque deviation ΔTh by a proportional gain Kp. A proportional variable gain calculation process M74 is a process of calculating a proportional variable gain Gp by using the output value of the absolute value calculation process M60 as an input. The proportional variable gain calculation process M74 is a process in which the proportional variable gain Gp when the output value of the absolute value calculation process M60 is large is equal to or less than the proportional variable gain Gp when the output value of the absolute value calculation process M60 is small. This process may be, for example, a process in which the PU 72 performs a map calculation of the proportional variable gain Gp with map data stored in the storage device 74. The map data is data whose input variable is the output value of the absolute value calculation process M60 and whose output variable is the value of the proportional variable gain Gp.

More specifically, the proportional variable gain Gp takes constant values that are different between a case where the output value of the absolute value calculation process M60 is equal to or less than a first threshold value T1 and a case where the output value of the absolute value calculation process M60 is equal to or greater than a second threshold value T2. When the output value of the absolute value calculation process M60 is greater than the first threshold value T1 and less than the second threshold value T2, the proportional variable gain Gp is a value that monotonically decreases according to the output value of the absolute value calculation process M60.

A proportional variable gain multiplication process M76 is a process of multiplying the output value of the proportional gain multiplication process M72 by the proportional variable gain Gp. The output value of the proportional variable gain multiplication process M76 is the output value of the proportional element M70. The output value of the proportional element M70 is a value obtained by multiplying the torque deviation ΔTh by the proportional gain Kp and the proportional variable gain Gp. That is, the gain of the proportional element M70 is the product of the proportional gain Kp and the proportional variable gain Gp.

A derivative element M80 is a process that takes the torque deviation ΔTh as an input and outputs a value proportional to the first-order time derivative of the torque deviation ΔTh. More specifically, a linear operator M82 is a process of calculating the first-order time derivative of the torque deviation ΔTh. A derivative gain multiplication process M84 is a process of multiplying the output value of the linear operator M82 by a derivative gain Kd. A derivative variable gain calculation process M86 is a process of calculating a derivative variable gain Gd by using the output value of the absolute value calculation process M60 as an input. The derivative variable gain calculation process M86 is a process in which the derivative variable gain Gd when the output value of the absolute value calculation process M60 is large is equal to or greater than the derivative variable gain Gd when the output value of the absolute value calculation process M60 is small. This process may be, for example, a process in which the PU 72 performs a map calculation of the derivative variable gain Gd with map data stored in the storage device 74. The map data is data whose input variable is the output value of the absolute value calculation process M60 and whose output variable is the value of the derivative variable gain Gd.

More specifically, the derivative variable gain Gd takes constant values that are different between a case where the output value of the absolute value calculation process M60 is equal to or less than a third threshold value T3 and a case where the output value of the absolute value calculation process M60 is equal to or greater than a fourth threshold value T4. When the output value of the absolute value calculation process M60 is greater than the third threshold value T3 and less than the fourth threshold value T4, the derivative variable gain Gd is a value that monotonically increases according to the output value of the absolute value calculation process M60. The first threshold value T1 and the third threshold value T3 may be the same. The second threshold value T2 and the fourth threshold value T4 may be the same.

A derivative variable gain multiplication process M88 is a process of multiplying the output value of the derivative gain multiplication process M84 by the derivative variable gain Gd. The output value of the derivative variable gain multiplication process M88 is the output value of the derivative element M80. That is, the output value of the derivative element M80 is a value obtained by multiplying the first-order time derivative of the torque deviation ΔTh by the derivative gain Kd and the derivative variable gain Gd. That is, the gain of the derivative element M80 is the product of the derivative gain Kd and the derivative variable gain Gd.

An addition process M90 is a process of adding the output value of the proportional element M70 and the output value of the derivative element M80 and outputting the sum as a PD manipulated variable Tpd. A second manipulated variable calculation process M92 is a process of calculating a manipulated variable other than the PD manipulated variable Tpd, for generating the target reaction force Ts*. The second manipulated variable calculation process M92 may include, for example, at least one of processes (A) to (H) described below.

The process (A) is a process of calculating a manipulated variable according to a cumulative value of a value obtained by subtracting the steering torque Th from an estimated axial force. The estimated axial force is a value equivalent to the torque of the reaction force motor 20. The estimated axial force is a value calculated by the PU 72 inputting the currents iu1, iv1, and iw1.

The process (B) is a process of calculating, as a manipulated variable, a cumulative value of a value obtained by multiplying the difference between the steering torque Th and the target steering torque Th* by an integral gain. The process (C) is a process of calculating a manipulated variable for controlling steering torque estimated by a disturbance observer to the target steering torque Th*. The process (C) takes, as inputs, the steering angle θh, the torque of the reaction force motor 20 calculated from the currents iu1, iv1, and iw1, etc.

The process (D) is a process of calculating an open loop manipulated variable in which the steering torque Th is taken as an input. The process (E) is a process of calculating an open loop manipulated variable in which the target steering torque Th* is taken as an input.

An addition process M94 is a process of calculating the target reaction force Ts* by adding the PD manipulated variable Tpd and a second manipulated variable Ts2 output through the second manipulated variable calculation process M92.

Functions and Effects of First Embodiment

When the magnitude of the pinion angle θp is equal to or greater than the end threshold value θpth, the PU 72 superimposes the end reaction force Ten on the target steering torque Th*. Therefore, when the magnitude of the pinion angle θp is equal to or greater than the end threshold value θpth, the magnitude of the target steering torque Th* increases. When the steering angle θh deviates significantly from the reference steering angle θhr, the PU 72 superimposes the deviation compensation reaction force Tcom on the target steering torque Th*. Therefore, when the steering angle θh deviates significantly from the reference steering angle θhr, the magnitude of the target steering torque Th* increases. When the magnitude of the target steering torque Th* is large, the control on the steering torque Th is more likely to be unstable than when the magnitude of the target steering torque Th* is small.

Therefore, the PU 72 variably sets the gain of the proportional element M70 and the gain of the derivative element M80 according to the magnitude of the target steering torque Th*. This makes it possible to set appropriate gains according to the target steering torque Th*. Therefore, it is possible to suitably achieve both stability and responsivity of the control on the steering torque Th. Thus, according to the present embodiment, it is possible to achieve a suitable compromise between stability and responsivity of the feedback control on the steering torque Th.

The steering angle θh may deviate significantly from the reference steering angle θhr, for example, when a curb hinders the steering of the steered wheels 44. According to the embodiment described above, the following functions and effects can further be obtained.

(1-1) The gain of the proportional element M70 when the magnitude of the target steering torque Th* is large is set equal to or less than the gain of the proportional element M70 when the magnitude of the target steering torque Th* is small. Thus, in a steering device in which the control is unstable due to a large magnitude of the target steering torque Th*, the instability of the control can be suppressed in a steering device in which the instability can be suppressed by reducing the proportional gain. Moreover, when the magnitude of the target steering torque Th* is small, the responsivity of the control on the steering angle θh can be increased by increasing the gain of the proportional element M70.

(1-2) The gain of the derivative element M80 when the magnitude of the target steering torque Th* is large is set equal to or greater than the gain of the derivative element M80 when the magnitude of the target steering torque Th* is small. Thus, in a steering device in which the control is unstable due to a large magnitude of the target steering torque Th*, the instability of the control can be suppressed in a steering device in which the instability can be suppressed by increasing the derivative gain.

(1-3) The PU 72 operates the reaction force inverter 22 with the steering wheel 12 and the steered wheels 44 mechanically separated. In other words, the control in FIG. 3 is employed in the steer-by-wire steering device. Even though a controller does not generate vibrations in a steering device in which the steering wheel 12 and the steered wheels 44 are mechanically connected, vibrations may occur in the steer-by-wire steering device. Accordingly, the control in FIG. 3 is particularly useful.

Vibrations are likely to occur in the steer-by-wire steering device presumably because, when the magnitude of the steering torque Th is large enough to overcome the friction component, the load applied to the steering wheel 12 is small. That is, when the steering wheel 12 and the steered wheels 44 are mechanically connected, load torque from the steered wheels 44 is applied to the steering wheel 12. It is presumed that this load torque tends to reduce the occurrence of vibrations.

Second Embodiment

A second embodiment will be described below with reference to the drawings, focusing on the differences from the first embodiment.

Figure 4:
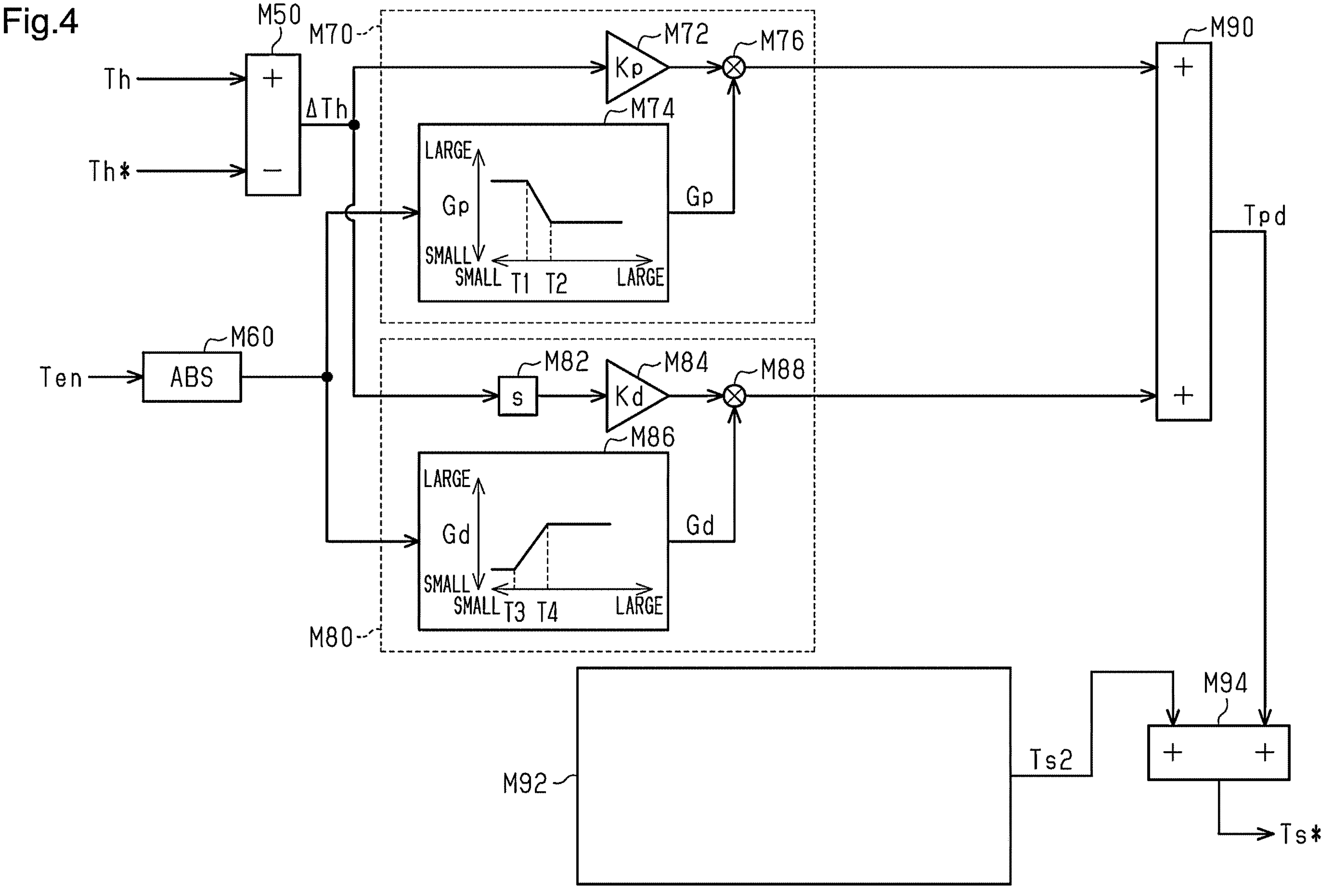
FIG. 4 is a block diagram showing part of processes that are performed by a steering control device according to a second embodiment.

FIG. 4 shows details of the target reaction force calculation process M40 according to the present embodiment. In FIG. 4, the processes corresponding to those shown in FIG.

3 are denoted by the same signs for convenience. In the present embodiment, the end reaction force Ten is input to the absolute value calculation process M60. That is, the absolute value calculation process M60 is a process of calculating the absolute value of the end reaction force Ten.

Functions and Effects of Second Embodiment

The PU 72 sets the gain of the proportional element M70 and the gain of the derivative element M80 according to the magnitude of the end reaction force Ten. When the magnitude of the pinion angle θp exceeds the end threshold value θpth, the magnitude of the end reaction force Ten increases. Therefore, the end reaction force Ten is a variable that causes the magnitude of the target steering torque Th* to become so large that the control becomes unstable. Thus, it is possible to achieve a suitable compromise between stability and responsivity of the feedback control on the steering torque Th by setting the gain of the proportional element M70 and the gain of the derivative element M80 according to the magnitude of the end reaction force Ten.

Third Embodiment

A third embodiment will be described below with reference to the drawings, focusing on the differences from the first embodiment.

Figure 5:
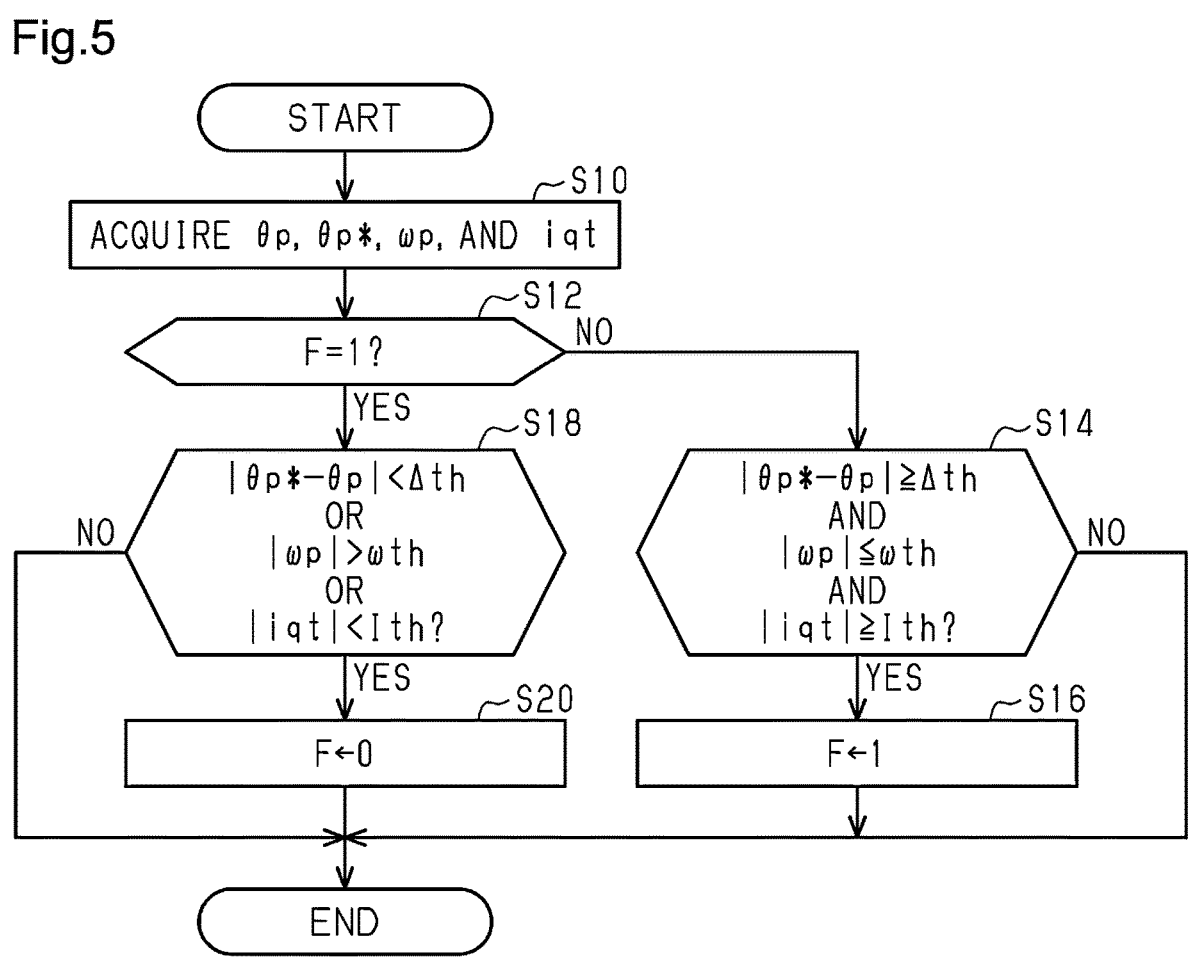

In the present embodiment, the proportional variable gain Gp and the derivative variable gain Gd are set using a determination result of a high load determination process. FIG. 5 shows the procedure of a process related to the high load determination. The process shown in FIG. 5 is implemented by the PU 72 repeatedly executing the steering control program 74*a* at, for example, a predetermined cycle. In the following description, the numbers preceded by the letter "S" represent step numbers of each process.

In the series of processes shown in FIG. 5, the PU 72 first acquires the pinion angle θp, the target pinion angle θp*, a pinion angular velocity ωp, and a q-axis current iqt (S10). The q-axis current iqt is a q-axis component of the currents flowing through the steering motor 60. The q-axis current iqt is calculated by the PU 72 using the currents iu2, iv2, and iw2 and the rotation angle θb as inputs.

Next, the PU 72 determines whether a high load determination flag F is "1" (S12). When the high load determination flag F is "1", it indicates a situation in which the magnitude of the torque of the steering motor 60 requested to cause the pinion angle θp to follow the target pinion angle θp* is excessively large. When the high load determination flag F is "0", it indicates that the above situation does not occur.

When the PU 72 determines that the high load determination flag F is not "1" (S12: NO), the PU 72 determines whether a logical conjunction of the following conditions (α) to (γ) is true (S14).

Condition (α): The absolute value of the difference between the target pinion angle θp* and the pinion angle θp is equal to or greater than a threshold value Δth. The threshold value Δth may be set to, for example, a value equal to or greater than the maximum value of the difference between the target pinion angle θp* and the pinion angle θp that may occur when the feedback control of the pinion angle feedback process M16 is performed normally.

Condition (β): The absolute value of the pinion angular velocity ωp is equal to or less than a predetermined velocity ωth. The predetermined velocity ωth is set less than the minimum value of the pinion angular velocity ωp that is implemented when the absolute value of the difference between the target pinion angle θp* and the pinion angle θp is large and the feedback control of the pinion angle feedback process M16 is performed normally.

Condition (γ): The magnitude of the q-axis current iqt is equal to or greater than a threshold value Ith. The threshold value Ith is set according to a permissible upper limit value of the q-axis current that can flow through the steering motor 60.

When the PU 72 determines that the logical conjunction is true (S14: YES), the PU 72 sets the high load determination flag F to "1" (S16). When the PU 72 determines that the high load determination flag F is "1" (S12: YES), the PU 72 determines whether the logical conjunction of the above conditions (α) to (γ) is false (S18). When the PU 72 determines that the logical conjunction is false (S18: YES), the PU 72 sets the high load determination flag F to "0" (S20).

Figure 6:
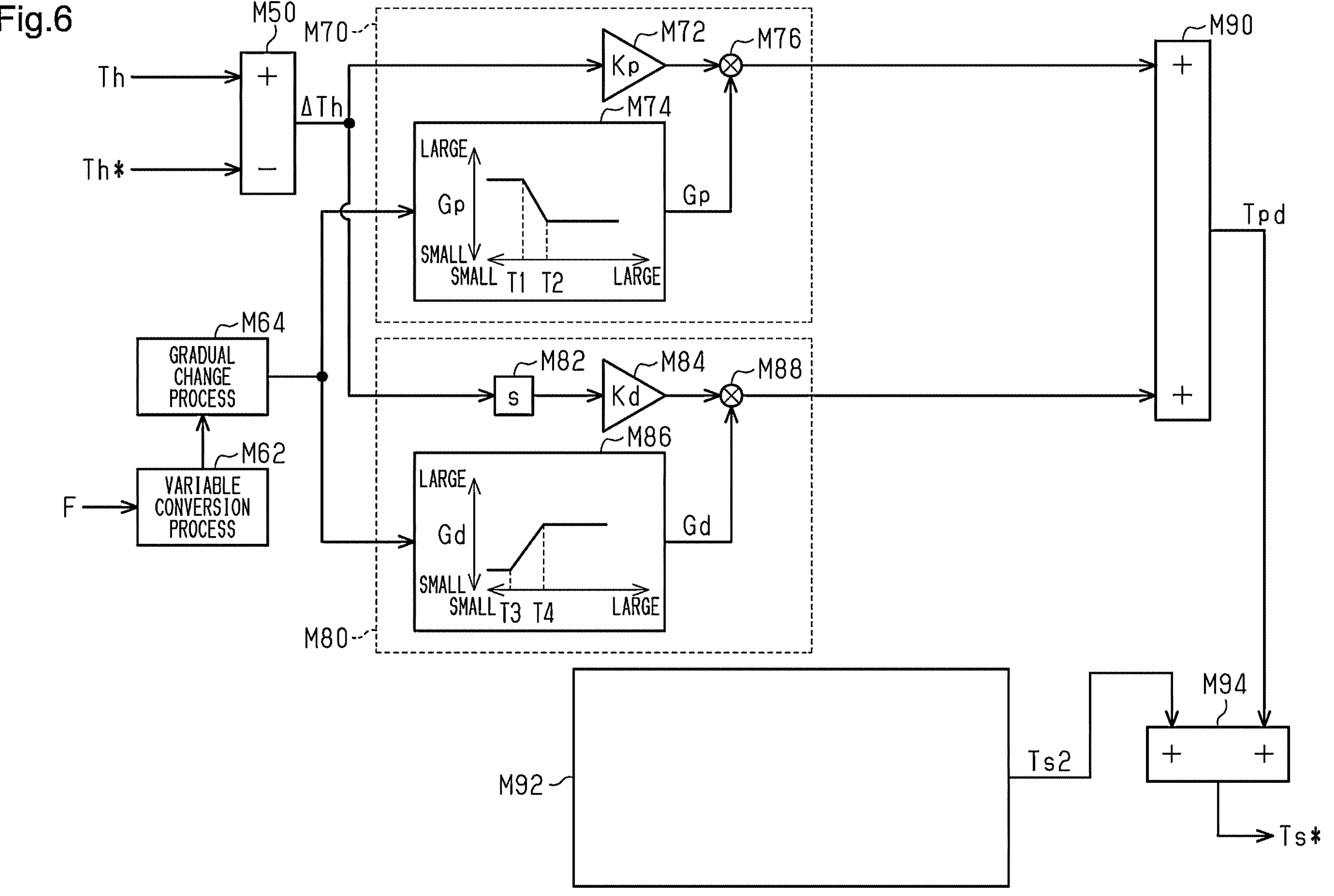
FIG. 6 is a block diagram showing part of the processes that are performed by the steering control device according to the third embodiment.

The PU 72 temporarily ends the series of processes shown in FIG. 5 when the process of S16 or S20 is completed or when the determination result is negative in the process of S14 or S18. FIG. 6 shows details of the target reaction force calculation process M40 according to the present embodiment. In FIG. 6, the processes corresponding to those shown in FIG. 3 are denoted by the same signs for convenience.

As shown in FIG. 6, the high load determination flag F is input to a variable conversion process M62. The variable conversion process M62 is a process of converting a binary label variable to a real value. The output value of the variable conversion process M62 is input to a gradual change process M64. The gradual change process M64 is a process of reducing the rate of change in the output variable relative to the change in the input variable. The gradual change process M64 may be, for example, a first-order lag filtering process.

The output value of the gradual change process M64 is input to the proportional variable gain calculation process M74 and the derivative variable gain calculation process M86.

Functions and Effects of Third Embodiment

The PU 72 sets the gain of the proportional element M70 and the gain of the derivative element M80 according to the magnitude of the real value of the high load determination flag F. When the high load determination flag F is "1", the target steering torque Th* increases. That is, for example, when the condition (α) is satisfied, the steering angle θh deviates significantly from the reference steering angle θhr. Therefore, the magnitude of the deviation compensation reaction force Tcom increases. Accordingly, the high load determination flag F of "1" is a variable that causes the magnitude of the target steering torque Th* to become so large that the control becomes unstable. Thus, it is possible to achieve a suitable compromise between stability and responsivity of the feedback control on the steering torque Th by setting the gain of the proportional element M70 and the gain of the derivative element M80 according to the value of the high load determination flag F.

According to the embodiment described above, the following functions and effects can further be obtained.

(3-1) The PU 72 sets the gain of the proportional element M70 and the gain of the derivative element M80 according to a value obtained by gradually changing the value of the high load determination flag F in the gradual change process M64. This makes it possible to suppress an abrupt change in the gain.

Fourth Embodiment

A fourth embodiment will be described below with reference to the drawings, focusing on the differences from the first embodiment.

Figure 7:
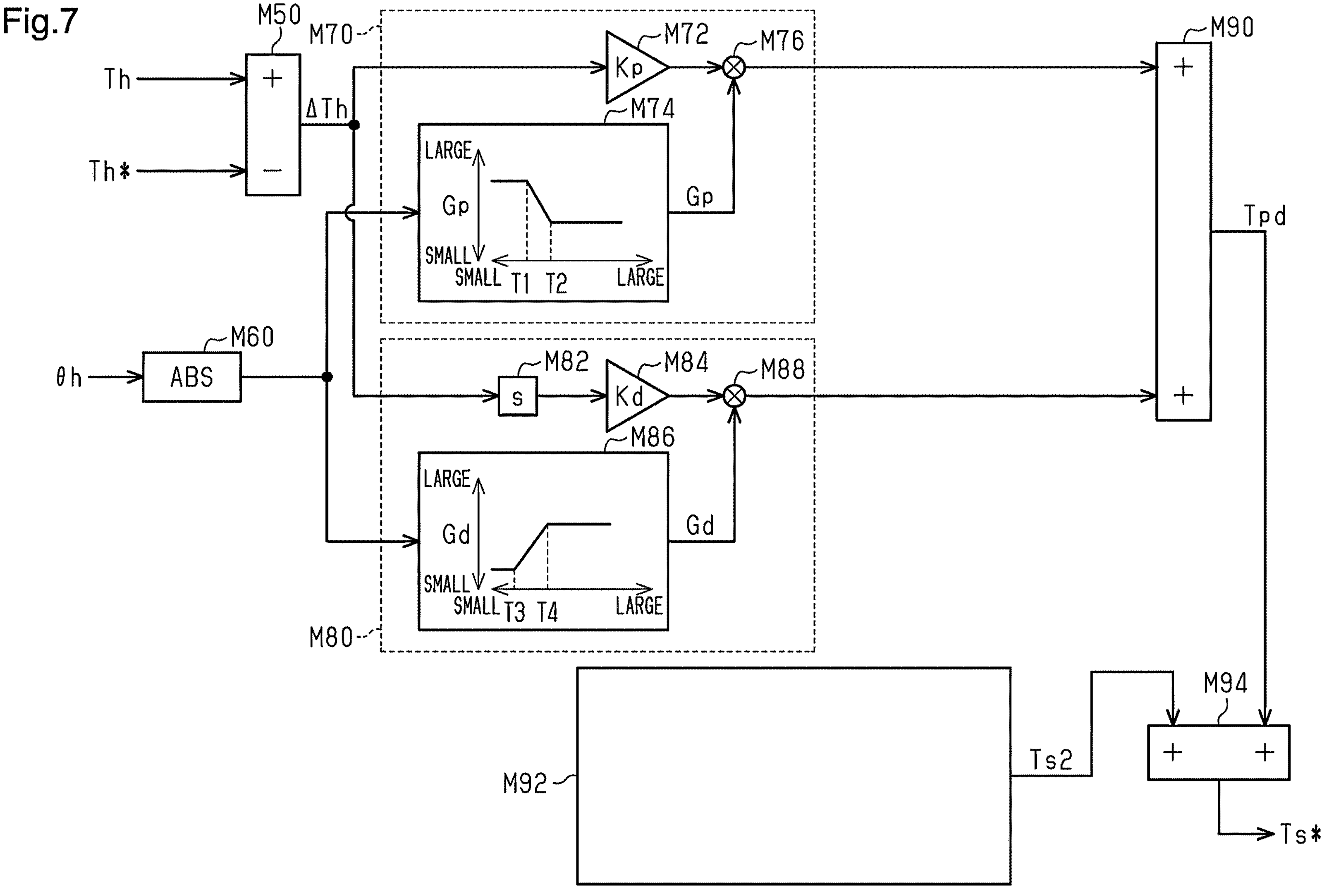
FIG. 7 is a block diagram showing part of processes that are performed by a steering control device according to a fourth embodiment.

FIG. 7 shows details of the target reaction force calculation process M40 according to the present embodiment. In FIG. 7, the processes corresponding to those shown in FIG. 3 are denoted by the same signs for convenience. In the present embodiment, the steering angle θh is input to the absolute value calculation process M60. That is, the absolute value calculation process M60 is a process of calculating the absolute value of the steering angle θh.

Functions and Effects of Fourth Embodiment

The PU 72 sets the gain of the proportional element M70 and the gain of the derivative element M80 according to the magnitude of the steering angle θh. When the magnitude of the steering angle θh is large, the magnitude of the pinion angle θp is also large. When the magnitude of the pinion angle θp exceeds the end threshold value θpth, the magnitude of the end reaction force Ten increases. Therefore, the magnitude of the steering angle θh is a variable that indicates whether the magnitude of the target steering torque Th* is so large that the control becomes unstable. Thus, it is possible to achieve a suitable compromise between stability and responsivity of the feedback control on the steering torque Th by setting the gain of the proportional element M70 and the gain of the derivative element M80 according to the magnitude of the steering angle θh.

Fifth Embodiment

A fifth embodiment will be described below with reference to the drawings, focusing on the differences from the first embodiment.

Figure 8:
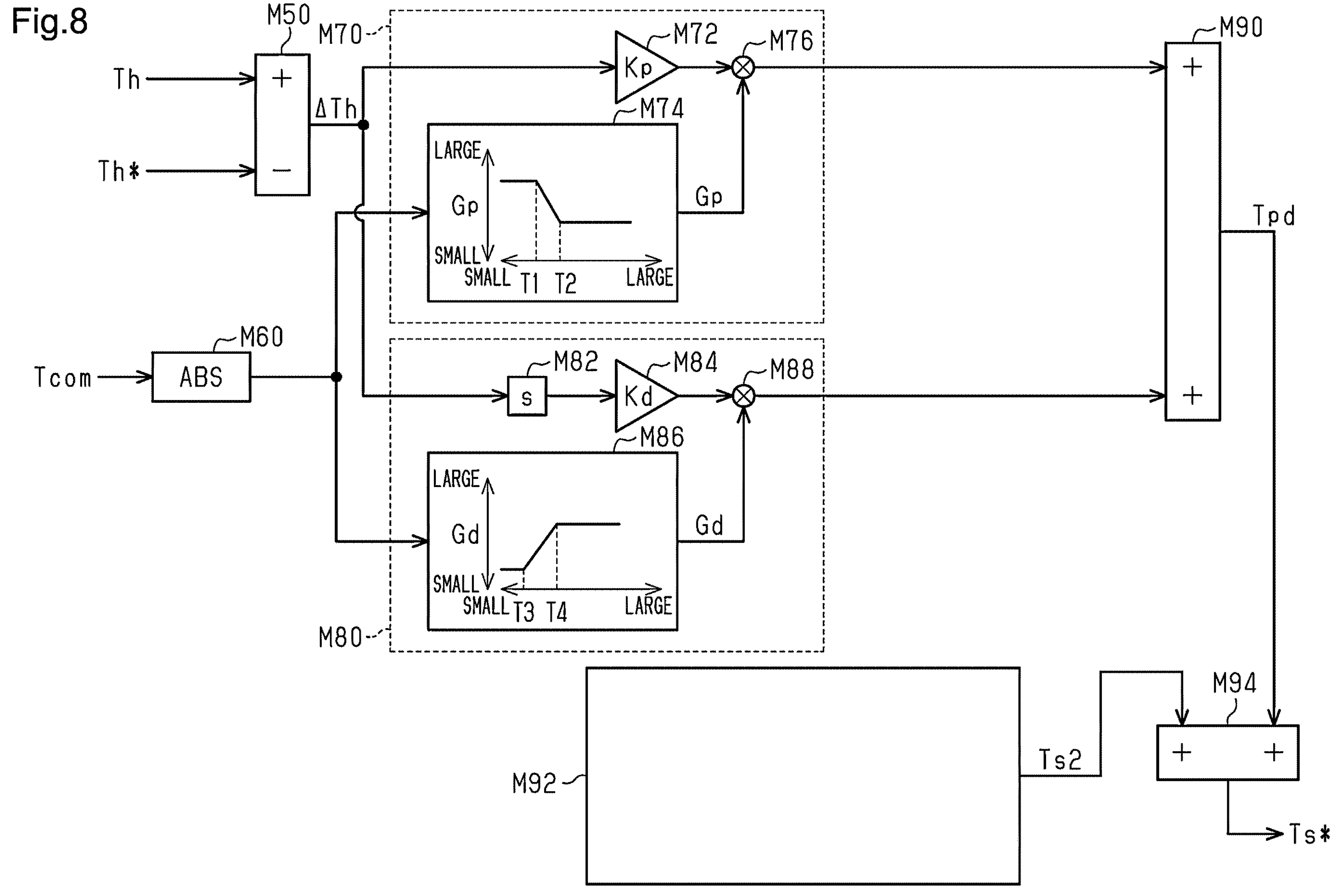
FIG. 8 is a block diagram showing part of processes that are performed by a steering control device according to a fifth embodiment.

FIG. 8 shows details of the target reaction force calculation process M40 according to the present embodiment. In FIG. 8, the processes corresponding to those shown in FIG. 3 are denoted by the same signs for convenience. In the present embodiment, the deviation compensation reaction force Tcom is input to the absolute value calculation process M60. That is, the absolute value calculation process M60 is a process of calculating the absolute value of the deviation compensation reaction force Tcom.

Functions and Effects of Fifth Embodiment

The PU 72 sets the gain of the proportional element M70 and the gain of the derivative element M80 according to the magnitude of the deviation compensation reaction force Tcom. When the steering angle θh deviates significantly from the reference steering angle θhr, the magnitude of the deviation compensation reaction force Tcom increases. Therefore, the deviation compensation reaction force Tcom is a variable that causes the magnitude of the target steering torque Th* to become so large that the control becomes unstable. Thus, it is possible to achieve a suitable compromise between stability and responsivity of the feedback control on the steering torque Th by setting the gain of the proportional element M70 and the gain of the derivative element M80 according to the magnitude of the deviation compensation reaction force Tcom.

Sixth Embodiment

A fifth embodiment will be described below with reference to the drawings, focusing on the differences from the first embodiment.

Figure 9:
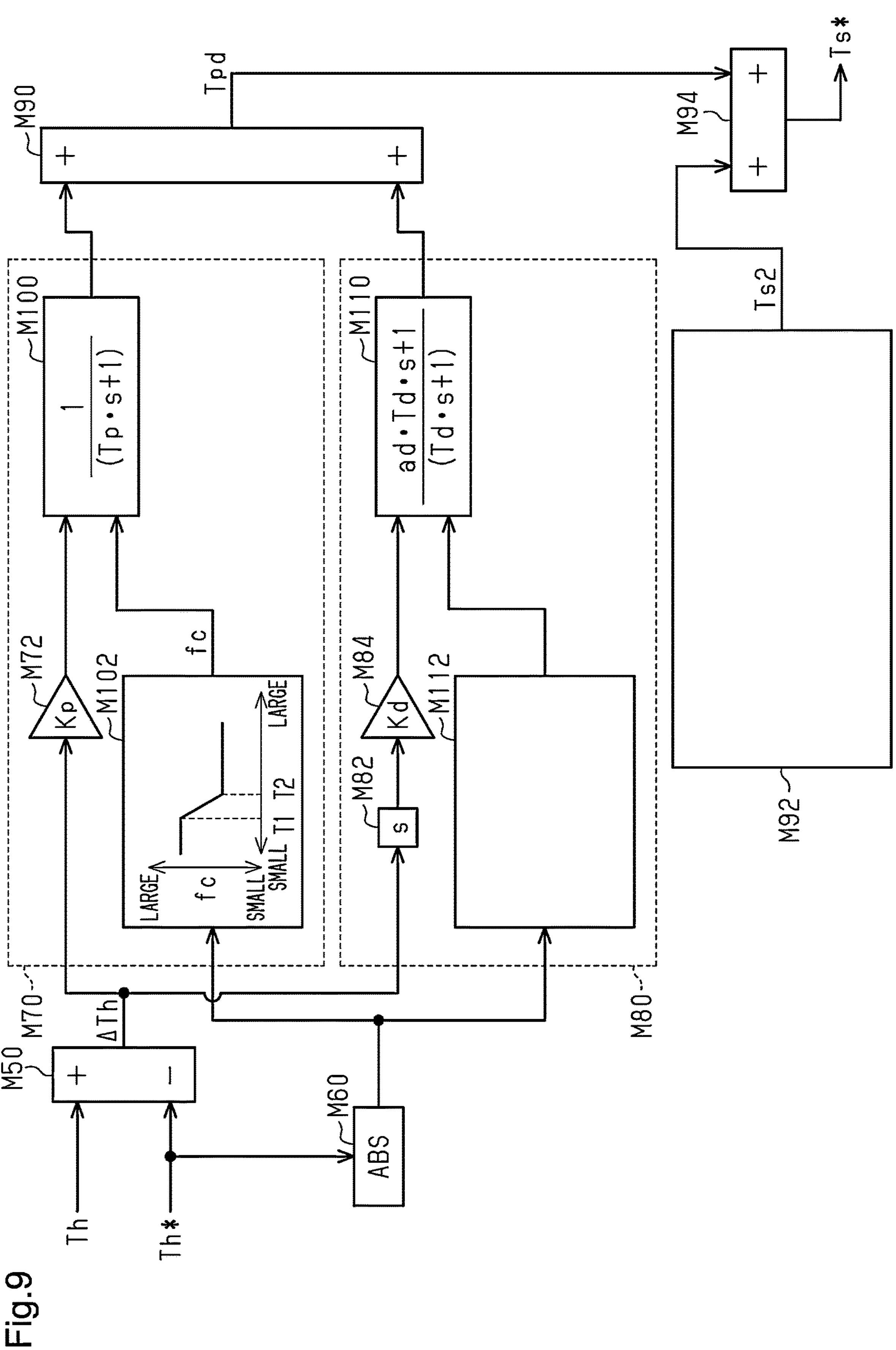
FIG. 9 is a block diagram showing part of processes that are performed by a steering control device according to a sixth embodiment.

FIG. 9 shows details of the target reaction force calculation process M40 according to the present embodiment. In FIG. 9, the processes corresponding to those shown in FIG. 3 are denoted by the same signs for convenience. As shown in FIG. 9, the proportional element M70 includes a proportional phase controller M100 and a proportional characteristic variable process M102. The proportional phase controller M100 performs a low-pass filtering process on the output value of the proportional gain multiplication process M72. Specifically, the proportional phase controller M100 is a first-order lag filter shown below.

$$1/(Tp \cdot s + 1)$$

where "Tp" is a time constant, and "s" is a linear operator indicating a first-order time derivative. The output value of the proportional phase controller M100 is the output value of the proportional element M70.

The proportional characteristic variable process M102 is a process of changing the characteristic of the proportional phase controller M100 according to the output value of the absolute value calculation process M60. More specifically, the proportional characteristic variable process M102 changes a cutoff frequency fc of the proportional phase controller M100 according to the output value of the absolute value calculation process M60. This process may be, for example, a process in which the PU 72 performs a map calculation of the time constant Tp with map data stored in the storage device 74. The map data is data whose input variable is the output value of the absolute value calculation process M60 and whose output variable is the value of the time constant Tp.

More specifically, the cutoff frequency fc takes constant values that are different between a case where the output value of the absolute value calculation process M60 is equal to or less than the first threshold value T1 and a case where the output value of the absolute value calculation process M60 is equal to or greater than the second threshold value T2. When the output value of the absolute value calculation process M60 is greater than the first threshold value T1 and less than the second threshold value T2, the cutoff frequency fc is a value that monotonically decreases according to the output value of the absolute value calculation process M60.

The derivative element M80 includes a derivative phase controller M110 and a derivative characteristic variable process M112. The derivative phase controller M110 is a process of advancing or retarding the phase of a predetermined frequency component of the output value of the derivative gain multiplication process M84. The derivative phase controller M110 is a phase controller with zero order difference as shown below.

$$\{ad \cdot Td \cdot s + 1\}/(Td \cdot s + 1)$$

where “Td” is a time constant. When “ad>1”, the phase of the predetermined frequency component can be advanced.

The derivative characteristic variable process M112 is a process of changing the characteristic of the derivative phase controller M110 according to the output value of the absolute value calculation process M60. More specifically, the derivative characteristic variable process M112 changes the above predetermined frequency component according to the output value of the absolute value calculation process M60. This process may be, for example, a process in which the PU 72 performs a map calculation of the time constant Td or the variable ad with map data stored in the storage device 74. The map data is data whose input variable is the output value of the absolute value calculation process M60 and whose output variable is the value of the time constant Td or the variable ad.

Functions and Effects of Sixth Embodiment

The PU 72 variably sets the frequency characteristic of the proportional element M70 and the frequency characteristic of the derivative element M80 according to the magnitude of the target steering torque Th*. This makes it possible to set appropriate frequency characteristics according to the target steering torque Th*. Therefore, it is possible to suitably achieve both stability and responsivity of the control on the steering torque Th. Thus, according to the present embodiment, it is possible to achieve a suitable compromise between stability and responsivity of the feedback control on the steering torque Th.

According to the embodiment described above, the following functions and effects can further be obtained.

(6-1) The cutoff frequency fc of the proportional phase controller M100 when the magnitude of the target steering torque Th* is large is set equal to or less than the cutoff frequency fc of the proportional phase controller M100 when the magnitude of the target steering torque Th* is small. In other words, the responsivity of the proportional element M70 when the magnitude of the target steering torque Th* is large is set equal to or less than the responsivity of the proportional element M70 when the magnitude of the target steering torque Th* is small. Thus, in a steering device in which the control is unstable due to a large magnitude of the target steering torque Th*, the instability of the control can be suppressed in a steering device in which the instability can be suppressed by reducing the responsivity of the proportional element M70. Moreover, when the magnitude of the target steering torque Th* is small, the responsivity of the control on the steering angle θh can be increased by increasing the responsivity of the proportional element M70.

(6-2) The characteristic of the derivative phase controller M110 is variably set according to the magnitude of the target steering torque Th*. Thus, the frequency characteristic of the derivative element M80 can be set to an appropriate characteristic according to the frequency characteristic of the proportional element M70.

Seventh Embodiment

A seventh embodiment will be described below with reference to the drawings, focusing on the differences from the sixth and second embodiments.

Figure 10:
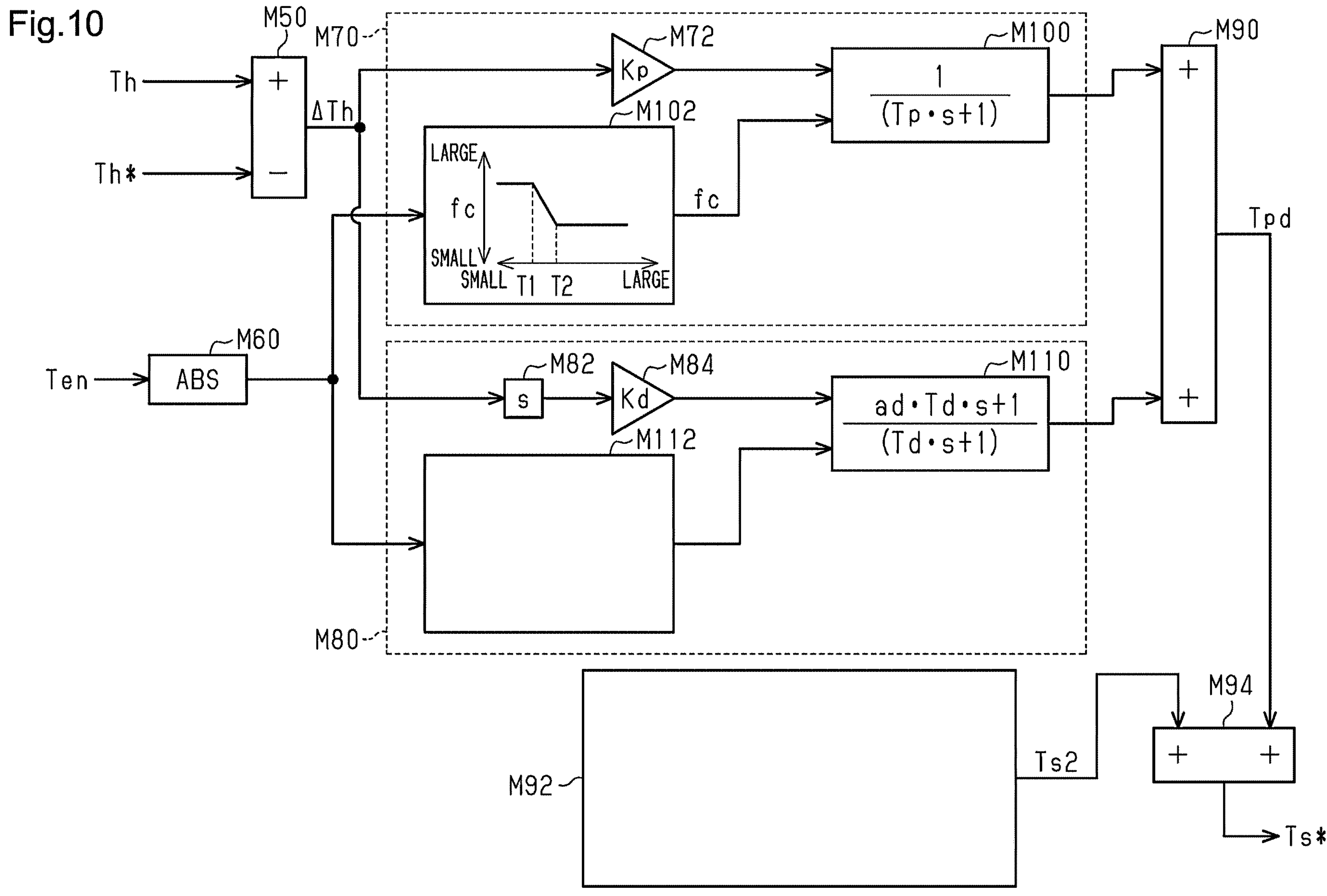
FIG. 10 is a block diagram showing part of processes that are performed by a steering control device according to a seventh embodiment.

FIG. 10 shows details of the target reaction force calculation process M40 according to the present embodiment. In FIG. 10, the processes corresponding to those shown in FIGS. 4 and 9 are denoted by the same signs for convenience.

In the present embodiment, the end reaction force Ten is input to the absolute value calculation process M60. That is, the absolute value calculation process M60 is a process of calculating the absolute value of the end reaction force Ten. The proportional characteristic variable process M102 and the derivative characteristic variable process M112 receive the output value of the absolute value calculation process M60 as an input.

Functions and Effects of Seventh Embodiment

The PU 72 sets the frequency characteristic of the proportional element M70 and the frequency characteristic of the derivative element M80 according to the magnitude of the end reaction force Ten. Therefore, the frequency characteristic of the proportional element M70 and the frequency characteristic of the derivative element M80 can be variably set in response to an increase in the magnitude of the target steering torque Th* that causes instability of the control. Thus, it is possible to achieve a suitable compromise between stability and responsivity of the feedback control on the steering torque Th.

Eighth Embodiment

An eighth embodiment will be described below with reference to the drawings, focusing on the differences from the third and sixth embodiments.

Figure 11:
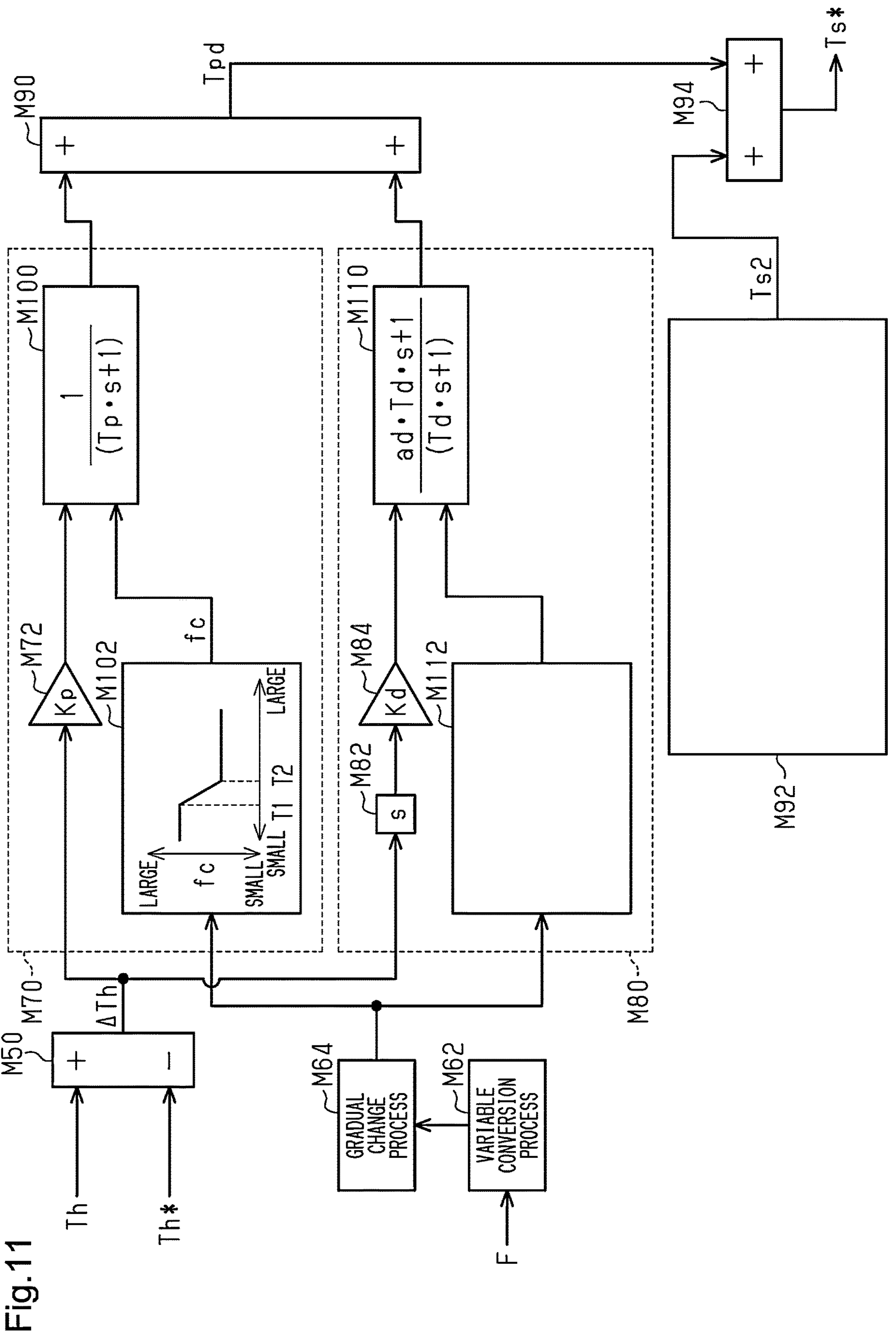
FIG. 11 is a block diagram showing part of processes that are performed by a steering control device according to an eighth embodiment.

In the present embodiment, the frequency characteristic of the proportional element M70 and the frequency characteristic of the derivative element M80 are set using the determination result of the high load determination process. FIG. 11 shows details of the target reaction force calculation process M40 according to the present embodiment. In FIG. 11, the processes corresponding to those shown in FIGS. 6 and 9 are denoted by the same signs for convenience.

As shown in FIG. 11, the high load determination flag F is input to the variable conversion process M62. The variable conversion process M62 is a process of converting a binary label variable to a real value. The output value of the variable conversion process M62 is input to the gradual change process M64. The gradual change process M64 is a process of reducing the rate of change in the output variable relative to the change in the input variable. The gradual change process M64 may be, for example, a first-order lag filtering process.

The output value of the gradual change process M64 is input to the proportional characteristic variable process M102 and the derivative characteristic variable process M112.

Functions and Effects of Eighth Embodiment

The PU 72 sets the frequency characteristic of the proportional element M70 and the frequency characteristic of the derivative element M80 according to the magnitude of the real value of the high load determination flag F. Therefore, the frequency characteristic of the proportional element M70 and the frequency characteristic of the derivative element M80 can be variably set in response to an increase in the magnitude of the target steering torque Th* that causes instability of the control. Thus, it is possible to achieve a suitable compromise between stability and responsivity of the feedback control on the steering torque Th.

Ninth Embodiment

A ninth embodiment will be described below with reference to the drawings, focusing on the differences from the fourth and sixth embodiments.

Figure 12:
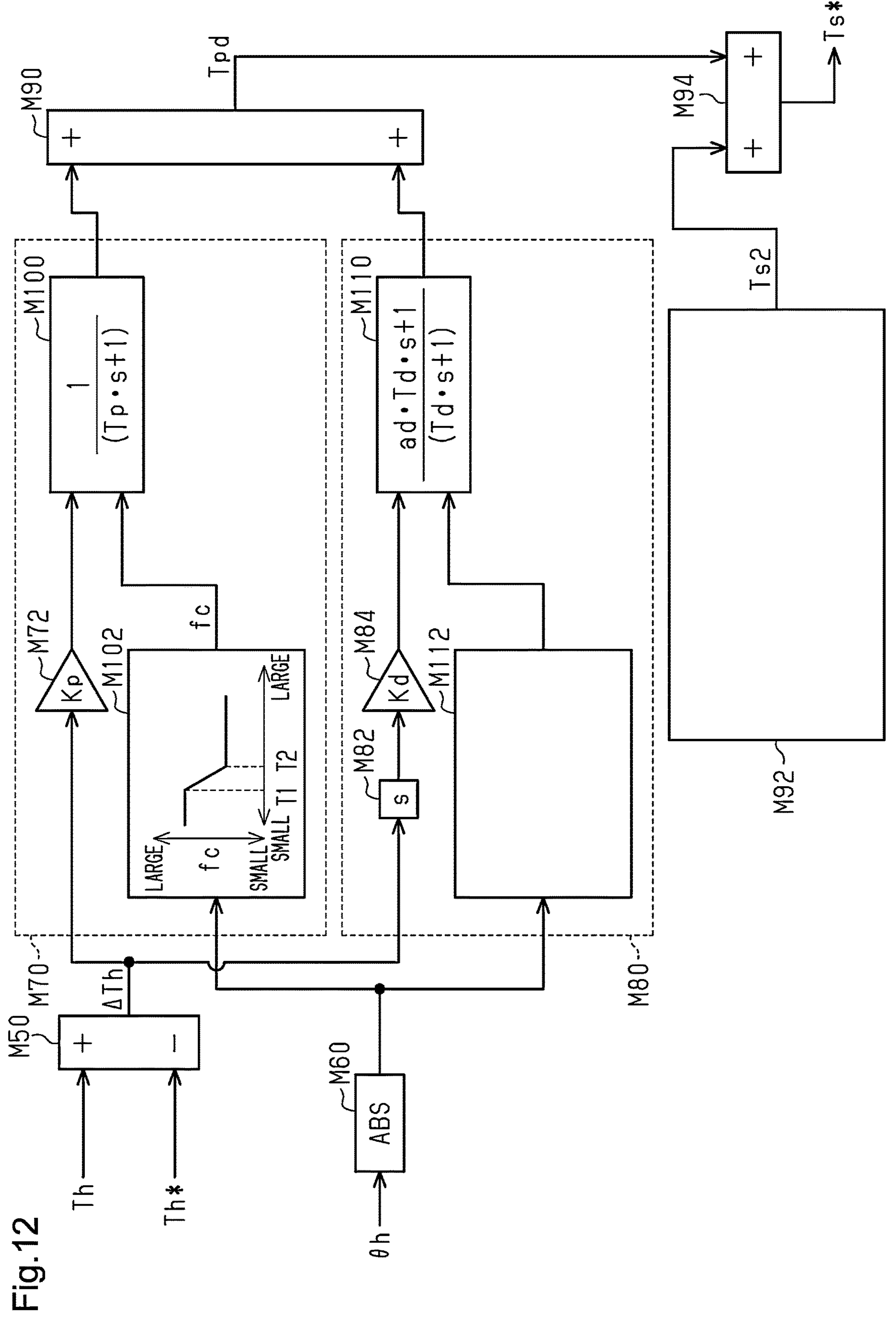
FIG. 12 is a block diagram showing part of processes that are performed by a steering control device according to a ninth embodiment.

FIG. 12 shows details of the target reaction force calculation process M40 according to the present embodiment. In FIG. 12, the processes corresponding to those shown in FIGS. 7 and 9 are denoted by the same signs for convenience.

In the present embodiment, the steering angle θh is input to the absolute value calculation process M60. That is, the absolute value calculation process M60 is a process of calculating the absolute value of the steering angle θh. The output value of the absolute value calculation process M60 is input to the proportional characteristic variable process M102 and the derivative characteristic variable process M112.

Tenth Embodiment

A tenth embodiment will be described below with reference to the drawings, focusing on the differences from the fifth and sixth embodiments.

Figure 13:
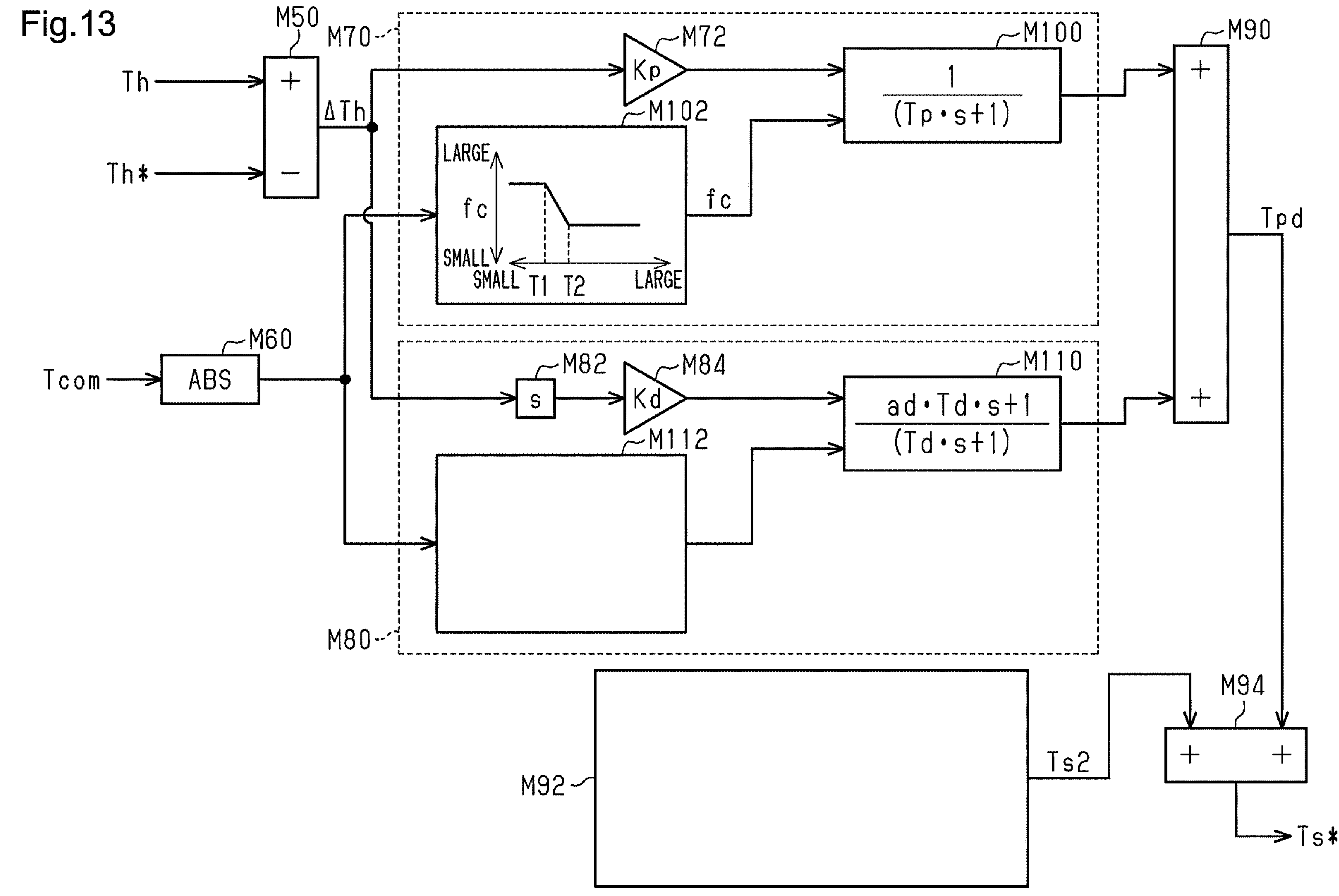
FIG. 13 is a block diagram showing part of processes that are performed by a steering control device according to a tenth embodiment.

FIG. 13 shows details of the target reaction force calculation process M40 according to the present embodiment. In FIG. 13, the processes corresponding to those shown in FIGS. 8 and 9 are denoted by the same signs for convenience.

In the present embodiment, the deviation compensation reaction force Tcom is input to the absolute value calculation process M60. That is, the absolute value calculation process M60 is a process of calculating the absolute value of the deviation compensation reaction force Tcom. The output value of the absolute value calculation process M60 is input to the proportional characteristic variable process M102 and the derivative characteristic variable process M112.

Eleventh Embodiment

An eleventh embodiment will be described below with reference to the drawings, focusing on the differences from the first embodiment.

Figure 14:
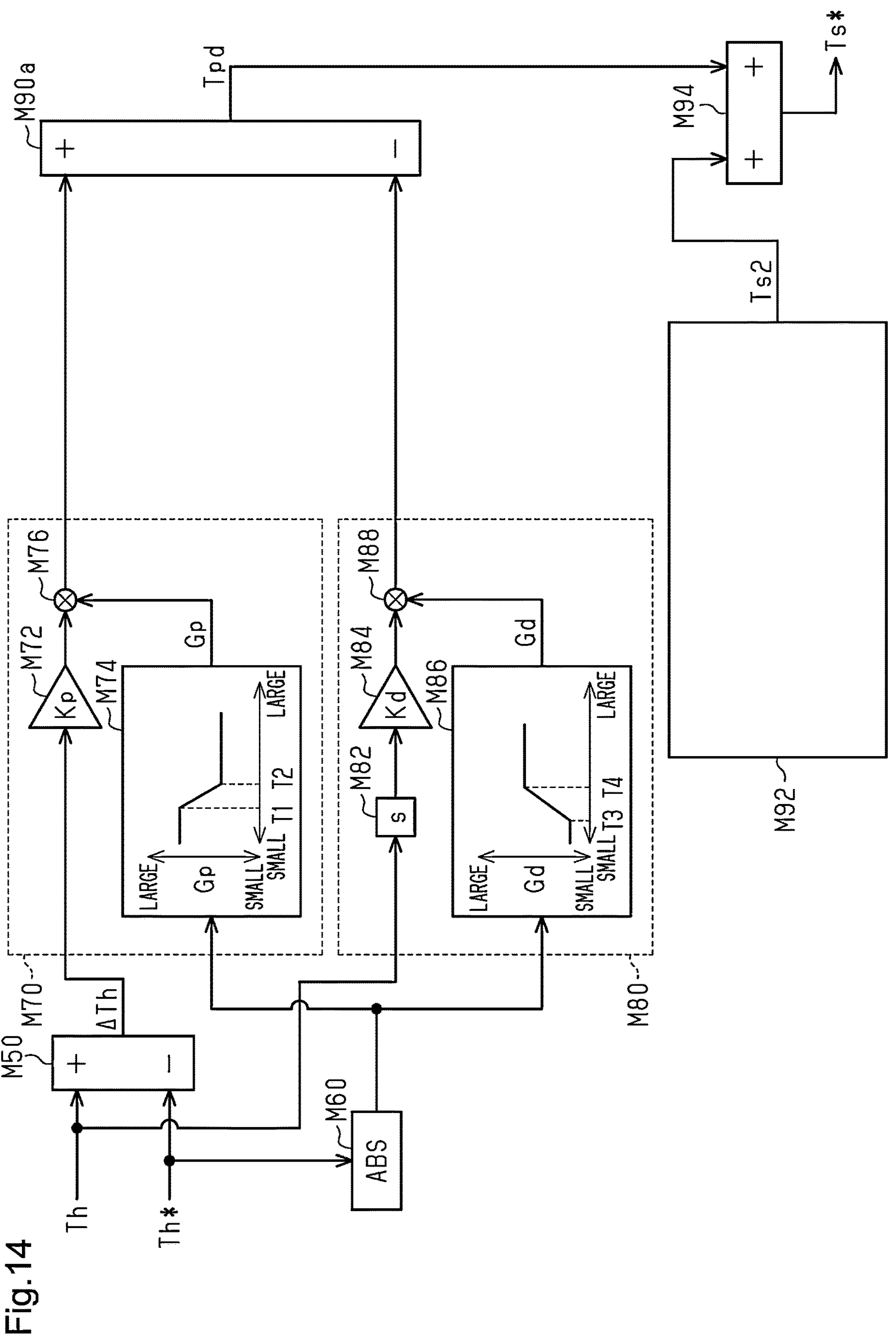
FIG. 14 is a block diagram showing part of processes that are performed by a steering control device according to an eleventh embodiment.

FIG. 14 shows details of the target reaction force calculation process M40 according to the present embodiment. In FIG. 14, the processes corresponding to those shown in FIG. 3 are denoted by the same signs for convenience.

As shown in FIG. 14, in the present embodiment, the input of the derivative element M80 is the steering torque Th. Accordingly, the linear operator M82 is a process of calculating the first-order time derivative of the steering torque Th. The derivative gain multiplication process M84 is a process of multiplying the first-order time derivative of the steering torque Th by the derivative gain Kd. The PD manipulated variable Tpd is a value obtained by subtracting the output value of the derivative element M80 from the output value of the proportional element M70 in a subtraction process M90*a*.

As described above, the PD manipulated variable Tpd according to the present embodiment is a manipulated variable of derivative leading PD control.

Other Embodiments

The embodiments can be modified and carried out as follows. The embodiments and the following modifications can be combined unless technical contradictions arise.

"Regarding Proportional Element"

- The proportional variable gain multiplication process M76 may be provided upstream of the proportional gain multiplication process M72. In other words, the torque deviation ΔTh may be multiplied by the proportional variable gain Gp.
- For example, the proportional phase controller M100 may be provided upstream of the proportional gain multiplication process M72.
- The proportional element M70 may be configured not to include the proportional characteristic variable process M102, while including the proportional phase controller M100.

"Regarding Derivative Element"

- The derivative variable gain multiplication process M88 may be provided upstream of the derivative gain multiplication process M84. In other words, the output value of the linear operator M82 may be multiplied by the derivative variable gain Gd. Alternatively, for example, the derivative variable gain multiplication process M88 may be provided upstream of the linear operator M82. In other words, the torque deviation ΔTh may be multiplied by the derivative variable gain Gd.
- For example, the derivative phase controller M110 may be provided between the linear operator M82 and the derivative gain multiplication process M84. Alternatively, for example, the derivative phase controller M110 may be provided upstream of the linear operator M82.
- The derivative element M80 need not include the derivative characteristic variable process M112, while including the derivative phase controller M110.

"Regarding Filtering Process"

(a) Regarding Proportional Phase Controller

- The proportional phase controller is not limited to the first-order lag element. For example, the proportional phase controller may be a second-order lag element. Alternatively, the proportional phase controller may be a phase controller with a relative degree of 0 as shown below.

$$\alpha p \cdot (Tp2 \cdot s + 1)/(Tp1 \cdot s + 1)$$

where "αp<1".

(b) Regarding Derivative Phase Controller M110

- The derivative phase controller is not limited to that shown in the above embodiments.

(c) Others

- Providing the phase controller in both the proportional element M70 and the derivative element M80 is not essential. For example, the controller may adjust the phase of the output value of the addition process M90 or the phase of the output value of the subtraction process M90*a*.

"Regarding Characteristic Change Process"

(a) Regarding Changes to Proportional Element M70

- The process of setting the gain of the proportional element M70 according to the magnitude of the torque of the reaction force motor 20 is not limited to the process shown in the above embodiments. For example, depending on the characteristic of the steering device, the gain when the magnitude of the torque of the reaction force motor 20 is large may be set equal to or greater than the gain when the magnitude of the torque of the reaction force motor 20 is small.

For example, both changing of the gain of the proportional element M70 regarding the proportional variable gain Gp and changing of the frequency characteristic of the proportional phase controller M100 may be performed.

(b) Regarding Changes to Derivative Element M80

The process of setting the gain of the derivative element M80 according to the magnitude of the torque of the reaction force motor 20 is not limited to the setting shown in the above embodiments. For example, depending on the characteristic of the steering device, the gain when the magnitude of the torque of the reaction force motor 20 is large may be set equal to or less than the gain when the magnitude of the torque of the reaction force motor 20 is small.

Both changing of the gain of the derivative element M80 regarding the derivative variable gain Gd and changing of the frequency characteristic of the derivative phase controller M110 may be performed.

(c) Regarding Inputs

The variable indicating the difference between the steering angle and the value obtained by converting the value of the steered angle variable to the corresponding steering angle is not limited to the deviation compensation reaction force Tcom. For example, the variable may be the difference between the reference steering angle θhr and the steering angle θh.

The input variable indicating the magnitude of the torque of the motor mechanically connected to the steering wheel 12 that is the operation member is not limited to the target torque variable that is the variable indicating the magnitude of the target steering torque. For example, in the case of a steering device in which the steering wheel 12 and the steered wheels 44 are mechanically connected as described in the section "Regarding Steering Device" below, the input variable may be a variable indicating the magnitude of the torque of the motor that steers the steered wheels 44.

(d) Others

The process of changing the gain of the derivative element M80 regarding the derivative variable gain Gd is not essential to the process of changing the gain of the proportional element M70 regarding the proportional variable gain Gp. That is, for example, the process of changing the gain of the derivative element M80 regarding the derivative variable gain Gd need not be performed, while the process of changing the gain of the proportional element M70 regarding the proportional variable gain Gp is performed.

The process of changing the frequency characteristic of the derivative phase controller M110 is not essential to the process of changing the frequency characteristic of the proportional phase controller M100. That is, for example, the process of changing the frequency characteristic of the derivative phase controller M110 need not be performed, while the process of changing the frequency characteristic of the proportional phase controller M100 is performed.

The characteristic change process in the case where the PD manipulated variable Tpd is the manipulated variable of derivative leading PD control is not limited to the controller shown in FIG. 14. For example, the processes shown in FIGS. 4 to 13 may be used.

"Regarding End Reaction Force Ten"

In the above embodiments, the end reaction force Ten is calculated by using the pinion angle θp as an input. However, the present disclosure is not limited to this. For example, the steering angle θh may be used as the steered angle variable that is the variable indicating the steered angle. That is, the steering angle θh is the variable indicating the steered angle because the magnitude of the steering angle θh and the magnitude of the steered angle have a positive correlation.

"Regarding Variable to Know Increase in End Reaction Force Ten"

In FIGS. 7 and 12, the steering angle θh is used as the variable to know whether the end reaction force Ten is large. However, the present disclosure is not limited to this. For example, the pinion angle θp may be used as the steered angle variable that is the variable indicating the steered angle.

"Regarding High Load Determination Process"

In the process shown in FIG. 5, the high load determination flag F is set to "0" when the logical conjunction of the conditions (α), (β), and (γ) is false. However, the present disclosure is not limited to this. For example, hysteresis may be provided to suppress hunting in the determination. That is, for example, the condition that the condition (a) is not satisfied in the process of S18 may be replaced with a condition that the absolute value of the difference is equal to or less than "Δth−δ".

In the condition (β), the pinion angular velocity ωp is used as the steered angular velocity variable. However, the present disclosure is not limited to this. For example, a steering angular velocity that is the rate of change in the steering angle θh may be used.

The high load determination process is not limited to the process shown in FIG. 5. For example, the process may be such that the high load determination flag F is set to "1" when the logical conjunction of the above conditions (α) and (β) is true.

"Regarding Manipulated Variable for Controlling Steering Torque to Target Steering Torque"

The manipulated variable for controlling the steering torque to the target steering torque is not limited to the target reaction force Ts*. In other words, this manipulated variable is not limited to the target value of torque for the reaction force motor 20. For example, when the reaction force motor 20 is a surface permanent magnet synchronous motor, this manipulated variable may be a command value for a q-axis current. Alternatively, when the reaction force motor 20 is an interior permanent magnet synchronous motor, this manipulated variable may be a set of a command value for a d-axis current and a command value for a q-axis current.

The manipulated variable for controlling the steering torque to the target steering torque is not limited to the variable indicating the reaction force to be applied to the steering wheel 12. For example, in the case of a device in which power can be transmitted between the steering wheel 12 and the steered wheels 44 as described in the section "Regarding Steering System" below, this is a variable indicating torque that assists in torque applied to the steering wheel 12 by the driver.

"Regarding Torque Feedback Process"

Including the second manipulated variable calculation process M92 is not essential for the target reaction force calculation process M40 that is the torque feedback process.

"Regarding Process of Calculating Base Target Torque Thb*"

The process of calculating the base target torque Thb* by using the axial force Taf as an input is not limited to the process that takes the vehicle speed V as an input in addition to the axial force Taf.

Calculating the base target torque Thb* by using the axial force Taf as an input is not essential. For example, the base target torque Thb* may be calculated by using the steering torque Th and the vehicle speed V as inputs. For example, this can be implemented by the PU 72 performing a map calculation of the base target torque Thb* with map data stored in the storage device 74. The map data is data whose input variables are the steering torque Th and the vehicle speed V and whose output variable is the base target torque Thb*.

"Regarding Operation Process"

The technique of controlling the reaction force motor 20 is not limited to the feedback process on the dq-axis currents. For example, in a case where a direct current motor is employed as the reaction force motor 20 and an H-bridge circuit is used as the drive circuit, the current that flows through the reaction force motor 20 may be simply controlled.

"Regarding Control on Steered Angle"

Instead of the pinion angle feedback process M16, a process of controlling a detected value of the amount of movement of the steered shaft 40 to a target value may be used. In this case, the controlled variable regarding the pinion angle θp, etc. in the above embodiments is replaced with a controlled variable regarding the amount of movement of the steered shaft 40, etc.

It is not essential for the control on the steered angle to include the process of calculating the manipulated variable for controlling the controlled variable indicating the steered angle, such as the pinion angle θp, through the feedback control. For example, the control on the steered angle may include a process of calculating the manipulated variable for controlling the controlled variable indicating the steered angle to a target value through open-loop control. Alternatively, for example, the control on the steered angle may include a process of calculating the sum of the manipulated variable for the open-loop control and the manipulated variable for the feedback control.

The technique of controlling the steering motor 60 is not limited to the feedback process on the dq-axis currents. For example, in a case where a direct current motor is employed as the steering motor 60 and an H-bridge circuit is used as the drive circuit, the current that flows through the steering motor 60 may be simply controlled.

"Regarding Operation Member"

The operation member to be operated by the driver to steer the vehicle is not limited to the steering wheel 12. For example, the operation member may be a joystick.

"Regarding Motor Mechanically Connected to Operation Member"

(a) Regarding Reaction Force Actuator Ar

The reaction force motor 20 mechanically connected to the steering wheel 12 is not limited to the three-phase brushless motor. For example, the reaction force motor 20 may be a brushed direct current motor.

(b) Regarding Drive Circuit for Motor

The drive circuit for the motor that is mechanically connected to the operation member is not limited to the reaction force inverter 22. For example, this drive circuit may be an H-bridge circuit.

(c) Others

It is not essential to provide the speed reduction mechanism 16.

"Regarding Steering Control Device"

The steering control device is not limited to the control device that includes the PU 72 and the storage device 74 and that performs software processing. For example, the steering control device may include a dedicated hardware circuit such as an ASIC that performs at least part of the processes performed in the above embodiments. That is, the control device may include a processing circuit with any of the following configurations (a) to (c). (a) A processing circuit including: a processing device that performs all of the above processes according to a program; and a program storage device such as a storage device that stores the program. (b) A processing circuit including: a processing device that performs part of the above processes according to a program; a program storage device; and a dedicated hardware circuit that performs the rest of the processes. (c) A processing circuit including a dedicated hardware circuit that performs all of the above processes. There may be a plurality of software execution devices including a processing device and a program storage device. There may be a plurality of dedicated hardware circuits.

"Regarding Steering Actuator"

For example, a steering actuator in which the steering motor 60 is disposed coaxially with the steered shaft 40 may be employed as the steering actuator At. Alternatively, for example, a steering actuator connected to the steered shaft 40 via a belt speed reducer that uses a ball screw mechanism may be employed.

The steering actuator At is not limited to the one configured such that the right steered wheel 44 and the left steered wheel 44 operate in conjunction with each other. In other words, the steering actuator At may be able to control the right steered wheel 44 and the left steered wheel 44 independently of each other.

"Regarding Steering Device"

The steering device that can change the relationship between the steering angle and the steered angle is not limited to the steering device in which power transmission between the steering wheel 12 and the steered wheels 44 is disconnected. For example, the steering device may be configured to change the relationship between the steering angle and the steered angle by using a variable gear as a gear that allows power transmission between the steering wheel 12 and the steered wheels 44. The steering device is not limited to the steering device that can change the relationship between the steering angle and the steered angle. For example, the steering device may be a steering device in which the steering wheel 12 and the steered wheels 44 are mechanically connected.

The invention claimed is:

1. A steering control device configured to operate a motor mechanically connected to an operation member to be operated by a driver to steer a vehicle, wherein:

the steering control device is configured to perform a torque feedback process, an operation process, and a characteristic change process;

the torque feedback process includes calculating a manipulated variable for controlling steering torque to target steering torque by feedback control;

the steering torque is torque input to the operation member;

the operation process includes operating a drive circuit for the motor based on the manipulated variable;

the torque feedback process includes calculating the manipulated variable based on (i) an output value of a proportional element of a difference between the steering torque and the target steering torque, and (ii) an output value of a derivative element of the difference;

the characteristic change process includes a process of setting a first gain according to a magnitude of torque of the motor, the first gain being at least one of a gain of the proportional element and a gain of the derivative element; and the first gain when the magnitude of the torque of the motor is equal to or greater than a second threshold is equal to or greater than the first gain when the magnitude of the torque of the motor is equal to or less than a first threshold, the first threshold being smaller than the second threshold.

2. The steering control device according to claim 1, wherein:

the characteristic change process includes setting the gain of the derivative element when the magnitude of the torque of the motor is equal to or greater than the second threshold to be equal to or greater than the gain of the derivative element when the magnitude of the torque of the motor is equal to or less than the first threshold.

3. The steering control device according to claim 2, wherein the characteristic change process includes setting the gain of the proportional element when the magnitude of the torque of the motor is equal to or greater than the second threshold to be equal to or less than the gain of the proportional element when the magnitude of the torque of the motor is equal to or less than the first threshold.

4. The steering control device according to claim 1, wherein:

the characteristic change process includes setting the gain of the proportional element when the magnitude of the torque of the motor is equal to or greater than the second threshold to be equal to or greater than the gain of the proportional element when the magnitude of the torque of the motor is equal to or less than the first threshold.

5. A steering control device configured to operate a motor mechanically connected to an operation member to be operated by a driver to steer a vehicle, wherein:

the steering control device is configured to perform a torque feedback process, an operation process, and a characteristic change process;

the torque feedback process includes calculating a manipulated variable for controlling steering torque to target steering torque by feedback control;

the steering torque is torque input to the operation member;

the operation process includes operating a drive circuit for the motor based on the manipulated variable;

the torque feedback process includes calculating the manipulated variable based on an output value of a derivative element, and a differential filtering process that advances or delays a phase of a predetermined frequency component of the derivative element; and the characteristic change process includes a process of changing the predetermined frequency component according to a magnitude of a torque of the motor.

6. The steering control device according to claim 1, wherein:

the process of setting the first gain uses a target torque variable as an input according to a magnitude of a value of the target torque variable;

the target torque variable is a variable according to a magnitude of the target steering torque; and the magnitude of the torque of the motor is controlled, through the operation process, to a larger value as the target steering torque increases.

7. The steering control device according to claim 6, wherein:

the steering control device is configured to perform a target steering torque calculation process;

the target steering torque calculation process includes calculating the target steering torque according to an end reaction force to prevent a magnitude of a steered angle from further increasing when a magnitude of a value of a steered angle variable is equal to or greater than an end threshold value;

the steered angle variable indicates the steered angle;

the steered angle is a turning angle of a steered wheel of the vehicle; and the target torque variable is a variable according to the end reaction force.

8. The steering control device according to claim 6, wherein:

the steering control device is configured to perform a target steering torque calculation process;

the target steering torque calculation process includes calculating the target steering torque according to an end reaction force to prevent a magnitude of a steered angle from further increasing when a magnitude of a value of a steered angle variable is equal to or greater than an end threshold value;

the steered angle variable indicates the steered angle;

the steered angle is a turning angle of a steered wheel of the vehicle; and the target torque variable is the value of the steered angle variable.

9. The steering control device according to claim 6, wherein:

the steering control device is configured to perform a steered angle feedback process, a high load determination process, and a target steering torque calculation process;

the steered angle feedback process includes controlling a value of a steered angle variable to a value of a target steered angle variable by feedback control;

the steered angle variable indicates a steered angle;

the steered angle is a turning angle of a steered wheel of the vehicle;

the high load determination process includes determining that the motor is in a high load state under a condition that a logical conjunction of a difference between the value of the steered angle variable and the value of the target steered angle variable being equal to or greater than a predetermined value and a magnitude of a value of a steered angular velocity variable being equal to or less than a predetermined velocity is true;

the steered angular velocity variable indicates a rate of change in the value of the steered angle variable;

the target steering torque calculation process includes calculating the target steering torque according to a high load reaction force to prevent a magnitude of the difference from further increasing when determination is made that the motor has a high load through the high load determination process; and the target torque variable indicates a determination result of the high load determination process.

10. The steering control device according to claim 9, wherein:

the steering control device is configured to perform a gradual change process; and the gradual change process includes a-process of generating the value of the target torque variable by gradually changing a change in a binary variable indicating the determination result of the high load determination process.

11. The steering control device according to claim 6, wherein:

the vehicle includes a steering device configured to change a relationship between an amount of displacement of the operation member and a steered angle;

the steered angle is a turning angle of a steered wheel of the vehicle;

the steering control device is configured to perform a steered angle control process and a target steering torque calculation process;

the steered angle control process includes controlling a value of a steered angle variable to a value of a target steered angle variable;

the steered angle variable is a variable indicating the steered angle;

the value of the target steered angle variable is set according to the amount of displacement of the operation member;

the target steering torque calculation process includes calculating the target steering torque according to a manipulated variable for control to reduce a difference between the amount of displacement of the operation member and a value obtained by converting the value of the steered angle variable to a corresponding amount of displacement of the operation member; and the target torque variable indicates the difference between the amount of displacement of the operation member and the value obtained by converting to the amount of displacement of the operation member.

12. The steering control device according to claim 1, wherein the steering control device is configured to perform the operation process in a state in which power transmission between the operation member and a steered wheel is disconnected.

13. A steering control method for operating a motor mechanically connected to an operation member to be operated by a driver to steer a vehicle, the steering control method comprising performing a torque feedback process, performing an operation process, and performing a characteristic change process, wherein:

the torque feedback process includes calculating a manipulated variable for controlling steering torque to target steering torque by feedback control;

the steering torque is torque input to the operation member;

the operation process includes operating a drive circuit for the motor based on the manipulated variable;

the torque feedback process includes calculating the manipulated variable based on (i) an output value of a proportional element of a difference between the steering torque and the target steering torque, and (ii) an output value of a derivative element of the difference;

the characteristic change process includes a process of setting a first gain according to a magnitude of torque of the motor, the first gain being at least one of a gain of the proportional element and a gain of the derivative element; and the first gain when the magnitude of the torque of the motor is equal to or greater than a second threshold is equal to or greater than the first gain when the magnitude of the torque of the motor is equal to or less than a first threshold, the first threshold being smaller than the second threshold.

* * * * *